United States Patent [19]

Sprankle, Jr. et al.

[11] Patent Number: 5,537,380
[45] Date of Patent: Jul. 16, 1996

[54] SONAR SYSTEM HAVING AN INTERACTIVE SONAR VIEWING APPARATUS AND METHOD OF CONFIGURING SAME

[75] Inventors: John W. Sprankle, Jr., Tulsa; Jeffrey M. McCollum, Broken Arrow, both of Okla.

[73] Assignee: Lowrance Electronics, Inc., Tulsa, Okla.

[21] Appl. No.: 503,080

[22] Filed: Jul. 14, 1995

[51] Int. Cl.⁶ .................................................... G01S 15/00
[52] U.S. Cl. .......................... 367/111; 367/105; 367/113
[58] Field of Search ............................. 367/87, 105, 111, 367/88, 103, 107, 113

[56] References Cited

U.S. PATENT DOCUMENTS

| | | | |
|---|---|---|---|
| 3,273,148 | 9/1966 | Wood et al. | 367/111 |
| 4,873,676 | 10/1989 | Bailey et al. | 367/98 |
| 4,879,697 | 11/1989 | Lowrance et al. | 367/111 |
| 4,935,906 | 6/1990 | Baker et al. | 367/111 |
| 4,937,767 | 6/1990 | Reuschel et al. | 367/105 |
| 4,943,951 | 7/1990 | Leavell et al. | 367/111 |
| 5,065,371 | 11/1991 | Leavell et al. | 367/111 |
| 5,140,558 | 8/1992 | Harrison et al. | 367/7 |
| 5,184,330 | 2/1993 | Adams et al. | 367/111 |
| 5,327,398 | 7/1994 | Wansley et al. | 367/108 |

OTHER PUBLICATIONS

3D–100, *Liquid Crystal Graph Installation and Operation Manual*, Eagle Electronics, Inc., Copyright 1987.
Advertisement, *Dimension 3*, Bass Pro Shops, Jan. 31, 1991.
Operations Manual, LCR 3D *Humminbird*, Techsonic Industries, Inc., Feb. 1992.
*Ultra 3D Installation and Operation Manual*, Eagle Electronics, Inc., Copyright 1992.
Operation Manual, *Humminbird* WIDE *Nineteen Ninety Five*, Techsonic Industries, Inc., Jan. 14, 1995.
WIDE 3D *Vision Operations Manual–Humminbird*, Techsonic Industries, Inc., undated.
*Dimension 3 Sonar Operations Manual–Humminbird*, Techsonic Industries, Inc., undated.
Advertising, *Dimension 3, The Power To See Into The Third Dimension–Humminbird*, Techsonic Industries, Inc., undated.
Advertising, 3–D *Positional Sonar, Eagle 3D–100, The New Dimension In Fishing Sonar*, Eagle Electronics, Inc., undated.
Advertising, *Ultra* 3D, *Advanced Sonar Technology With A New Perspective*, Eagle Electronics, Inc., undated.

*Primary Examiner*—J. Woodrow Eldred
*Attorney, Agent, or Firm*—Bell, Seltzer, Park & Gibson

[57] ABSTRACT

A sonar system includes an interactive sonar viewing apparatus for facilitating operator selection of a variety of features. The interactive sonar viewing apparatus can include a screen display for displaying a graphical representation of characterization data representative of the predetermined signal characteristics of each of the transducers. The characterization data can include data representative of the predetermined orientation and predetermined cone angle of each of the transducers. Based upon the graphical representation of the characterization data, the operator can select the specific transducers to be activated. Thus, the operator can selectively reconfigure the sonar system. Alternatively, the interactive sonar viewing apparatus can include a screen display which displays a graphical representation of orientation data representative of a number of display frames. The graphical representation provided by the screen display includes a graphical representation of the predetermined orientations of each of the display frames. Based upon the graphical representation of the orientation data, the operator can select the orientation in which the visual image of the sonar system will be graphically displayed. Accordingly, the operator can selectively orient the resulting visual image of the sonar system.

29 Claims, 16 Drawing Sheets

SONAR SYSTEM HAVING AN INTERACTIVE SONAR VIEWING APPARATUS AND METHOD OF CONFIGURING SAME

FIELD OF THE INVENTION

The present invention relates generally to sonar systems and associated sonar display methods and, more particularly, to sonar systems having an interactive sonar display and associated methods of configuring the interactive sonar display.

BACKGROUND OF THE INVENTION

Sonar systems, such as sonar depth finders and sonar fish finders, are commonly employed by boaters and sport fishermen. These sonar systems are based upon sonar systems developed during the World War II era which generated a sonar signal that was transmitted through a body of water and reflected by the bottom surface of the body of water to the sonar system. Based upon the length of time between the generation of the sonar signal and the reception of the reflected signal by the sonar system, these sonar systems could determine the distance to the bottom surface of the body of water.

Based on these early sonar systems, a number of sonar systems have been developed which display the reflected sonar signals in a variety of manners. For example, some sonar systems include rotating disk lamps or "flashers" which produce a pulse of light upon the reception of a reflected sonar signal. However, flashers do not generally provide historical data representative of the contour of the bottom surface of the body of water. Instead, the pulse of light provides only a momentary indication of the distance to the bottom surface of the body of water. Accordingly, the operator must closely monitor the flasher in order to determine the contour of the bottom surface of the body of water. In addition, sonar signals reflected by submerged objects, such as fish, are typically difficult to identify by the pulses of light provided by flashers since the pulses of light provide only a momentary indication of the distance to the submerged object from which the sonar signals are reflected.

In order to provide historical data indicative of the contour of the bottom surface of the body of water as well as the relative location of submerged objects, such as fish, sonar systems were developed which included a chart recorder. These sonar systems generate a strip chart on which markings indicate the contour of the bottom surface of the body of water as determined from the reflected sonar signals. While sonar systems incorporating chart recorders provide a permanent record of the contour of the bottom surface of the body of water, the strip charts produced by these sonar systems can be relatively difficult to interpret.

For example, the strip charts typically include a wide area or band of markings to indicate the relative location of the bottom surface of the body of water. However, thermoclines within the body of water or multiple reflections of the sonar signals, such as due to spurious reflections of the sonar signals from the bottom surface of the boat, can create additional reflections which, if received by the sonar system, will create additional lines or bands on the strip chart. In addition, the operator of a sonar system having a chart recorder may change the scale to which the strip chart is drawn in order to more clearly depict the bottom surface of a body of water. However, the strip chart generated prior to the change in scale will remain drawn to the previous, albeit different, scale. Thus, the operator of the sonar system may find it difficult to read and compare markings on the strip chart, particularly in the region in which the scale of the strip chart was changed.

Accordingly, sonar systems having associated display devices have been developed to provide a historical display of the bottom surface of the body of water over which the boat is passing as well as to identify submerged objects from which the sonar signals reflect. The associated display devices typically include cathode ray tubes, electroluminescent panels, liquid crystal displays and LED displays. These sonar systems also generally include advanced electrical circuitry, including one or more microprocessors or microcontrollers, to provide a number of features which allow the operator to customize the resulting display.

For example, U.S. Pat. No. 5,184,330 to James W. Adams et al. which issued Feb. 2, 1993 describes a sonar fish detection apparatus which provides a three-dimensional (3D) wire-frame display of the contour of the bottom surface of the body of water as well as submerged objects from which the sonar signals reflect. As illustrated in FIGS. 16–21, the sonar fish detection apparatus of the Adams '330 patent includes a number of display features which the operator can selectively activate. For example, the operator can increase or decrease the sensitivity of the sonar fish detection apparatus. The operator can also choose to display the speed of the boat on which the sonar fish detection apparatus is mounted. Still further, the operator can activate or deactivate both the fish alarm and the bottom alarm. The sonar fish detection apparatus of the Adams '330 patent also allows the operator to select the type of display which is generated. For example, the operator can select a three-quarters view, a straight-on view, or a side view.

In addition to providing displays which have a number of operator-selectable features as described above, sonar systems have also been developed which include a number of transducers for more accurately depicting the contour of the bottom surface of a body of water as well as objects submerged therein. For example, U.S. Pat. No. 4,879,697 to Darrell J. Lowrance, et al. which issued Nov. 7, 1989 and is assigned to the Lowrance Electronics, Inc. describes a sonar fish finder apparatus which includes three transducers. As shown in FIG. 4 of the Lowrance '697 patent, each transducer is mounted to emit sound waves in a generally conical beam which is directed in a predetermined orientation. The predetermined orientations in which the sound waves generated by each transducer are directed preferably extend in three different directions such that the sonar system can effectively map a relatively large portion of the bottom surface of the body of water.

In addition to being oriented in different directions, the sound waves generated by sonar transducers can have a variety of other signal characteristics. These signal characteristics can vary from transducer to transducer. For example, the cone angle and the frequency of the sonar signals emitted by the transducers can differ. Accordingly, the operator of a sonar system having multiple transducers can selectively activate predetermined ones of the transducers in order to optimize the resulting display. For example, the operator can selectively activate the transducers which emit sound waves oriented in a predetermined direction, such as a direction which is of particular interest to the operator. Alternatively, the operator may selectively activate the transducers having a cone angle and/or a frequency which is best suited for locating submerged objects, such as fish, at a predetermined depth or range of depths within the body of water. Accordingly, the operator can effectively optimize the performance of the sonar system based upon the selective activation of one or more transducers which emit sonar signals having the desired signal characteristics.

As described heretofore, sonar systems have been developed which produce historical displays of the contour of the bottom surface of the body of water over which the boat is passing as well as objects suspended therein. These sonar systems can include displays having a number of features which can be selected based upon the operator's display preferences. In addition, these sonar systems can include multiple transducers which can be selectively activated to optimize the performance of the sonar system.

While the increased number of operator-selectable features and options provided by conventional sonar systems increase the flexibility and can improve the performance of the sonar system, the selection and initiation of the features and options can complicate the process by which the operator configures and activates the sonar system. For example, in order to selectively activate the appropriate transducers and to configure the resulting display as desired, the operator of a conventional sonar system must be very knowledgeable and experienced in the operation of the sonar system in order to remember the sequence of steps required to appropriately configure the sonar system. Alternatively, an operator of a conventional sonar system must refer, oftentimes repeatedly, to a manual or to a textual or graphical screen display provided to the operator which describes the sequence of steps required to appropriately configure the sonar system, but which are typically cluttered with superfluous or extaneous information, thereby making it relatively difficult for the operator to appropriately configure the sonar system. As will be apparent, it is possible that the relatively complicated procedure required to selectively configure conventional sonar systems will decrease the number of operators who attempt to selectively configure the sonar system since such configuration can be time consuming and, in many instances, frustrating.

SUMMARY OF THE INVENTION

It is therefore an object of the present invention to provide an improved sonar system and associated method for facilitating operator selection of the various features provided by the sonar system.

It is another object of the present invention to provide a sonar system having an interactive sonar viewing apparatus which can be readily reconfigured by an operator to customize the resulting visual display provided thereby according to the operator's preferences.

It is another object of the present invention to provide a reconfigurable sonar system which facilitates operator selection of the specific transducers to be activated in order to optimize the performance of the sonar system.

These and other objects are provided, according to the present invention, by an interactive sonar viewing apparatus, operably connected to a sonar system, which facilitates operator selection of various predetermined features. In one embodiment, the interactive sonar viewing apparatus includes transducer selection means for facilitating operator selection of the specific transducers to activate, thereby allowing the operator to readily optimize the performance of the sonar system. In another embodiment, the interactive sonar viewing apparatus includes display orientation selection means for facilitating operator selection of the orientation of the resulting visual image, thereby allowing the operator to readily customize the sonar viewing apparatus according to the operator's display preferences. In either embodiment, the sonar system and, more particularly, the interactive sonar viewing apparatus provides readily recognized graphical representations to assist the operator's selection of the various features.

The sonar system generally includes at least one and, oftentimes, a plurality of transducers for emitting signals through a body of water and for receiving returning sonar signals reflected by objects within the body of water. Each transducer emits sonar signals having predetermined signal characteristics, such as a predetermined orientation and a predetermined cone angle. The sonar system also includes a controller for processing the returning sonar signals to generate echo data representative of the returning sonar signals and, therefore, representative of the objects within the body of water which reflect the sonar signals.

The sonar system of one embodiment also includes receiver means for receiving returning sonar signals initially received by the transducers. The receiver means includes a receiver for processing the returning sonar signals and multiplexing means, operably connected between the transducers and the receiver, for selecting the returning sonar signals initially received by at least one of the transducers for receipt by the receiver. Accordingly, the sonar system of this embodiment need not include a plurality of receivers, one of which is specifically associated with each of the transducers. Instead, the sonar system of this embodiment can include a common or universal receiver to which the returning sonar signals are selectively routed by the multiplexing means.

According to one embodiment of the present invention, the interactive sonar viewing apparatus includes signal characteristics storage means for storing characterization data representative of the predetermined signal characteristics of the plurality of transducers. This characterization data can include data representative of the predetermined orientation and the predetermined cone angle of each of the plurality of transducers, thereby defining the coverage provided by the transducers.

The interactive sonar viewing apparatus of this embodiment also includes a screen display for displaying a graphical representation of the characterization data representative of the predetermined signal characteristics of the plurality of transducers, independent of the returning sonar signals or the echo data generated by the controller. Accordingly, the screen display can clearly display the coverage provided by the respective transducer as defined by the characterization data without extraneous, and potentially confusing, textual or graphical displays.

Based upon the graphical representation of the characterization data by the screen display, the operator can select one or more of the plurality of transducers to be activated. The transducer selection means of the interactive sonar viewing apparatus of this embodiment is responsive to operator selection of at least one of the transducers to be activated. Accordingly, only those transducers selected by the operator will emit and receive sonar signals having the predetermined signal characteristics through the body of water. Thus, the operator can selectively reconfigure the sonar system to provide a desired or optimal display. For example, the operator can optimize the performance of the sonar system based upon the type of water, i.e., salt or fresh water, or the depth at which the operator believes fish will be located.

In order to further aid the operator during the transducer selection process, the interactive sonar viewing apparatus of this embodiment can include icon storage means. The icon storage means stores data representative of a reference icon, such as the icon of a boat. Accordingly, the screen display of this embodiment is capable of concurrently displaying the reference icon and the characterization data. The operator is therefore provided a frame of reference with respect to the predetermined signal characteristics of the plurality of transducers such that the operator can more readily select the desired transducers.

The interactive sonar viewing apparatus of the present invention can also include transducer designation means which provides designation data representative of the selected transducers to the screen display. According to this embodiment, the screen display is capable of concurrently displaying the designation data and the characterization data. Accordingly, the operator is provided with a visual display of the predetermined signal characteristics, such as the predetermined orientation and predetermined cone angle, of the selected transducers.

According to another embodiment of the present invention, the interactive sonar viewing apparatus includes display orientation storage means for storing orientation data representative of a plurality of display frames of different orientations. The orientation data typically includes data representative of a predetermined orientation of each display frame relative to the screen display. According to this embodiment, the screen display is capable of displaying a graphical representation of the orientation data representative of the plurality of display frames. In particular, the screen display is capable of displaying a graphical representation of the predetermined orientations of each of the plurality of display frames. Advantageously, the screen display is capable of sequentially displaying the orientation data representative of each of the plurality of display frames.

Based upon the graphical representation of the orientation data, the operator can select the orientation in which the echo data generated by the controller will be graphically displayed by the screen display. Accordingly, the display orientation selection means of the interactive sonar viewing apparatus of this embodiment is responsive to operator selection of a respective display frame for selecting the orientation in which the echo data will be graphically displayed by the screen display. The operator can therefore selectively orient the resulting visual image of the sonar system. For example, the operator can select a display frame which is oriented at an angle at which the operator is accustomed to viewing usual images or at an angle which will more clearly depict the submerged objects of interest to the operator.

The interactive sonar viewing apparatus of this embodiment can also include icon storage means. Accordingly, the screen display of this embodiment is preferably capable of concurrently displaying the reference icon and the orientation data. Thus, the operator is provided with a frame of reference with respect to the predetermined orientations of the display frames in order to further assist the operator in the selection of the orientation of the resulting visual image of the sonar system.

In conjunction with the display of the orientation data, the interactive sonar viewing apparatus can also include signal characteristics storage means. The screen display of this embodiment can therefore be capable of concurrently displaying the characterization data and the orientation data, thereby providing the operator with a graphical representation of the coverage provided by the transducers.

According to the present invention, the sonar system and, more particularly, the interactive sonar viewing apparatus provides graphical representations of various features provided by the sonar system in order to facilitate operator selection of the desired features. For example, the interactive sonar viewing apparatus of one embodiment graphically displays characterization data representative of the predetermined signal characteristics of the transducers in order to facilitate operator selection of the specific transducers to be activated. Accordingly, the operator can more readily optimize the performance of the sonar system. According to another embodiment, the interactive sonar viewing apparatus displays orientation data representative of, among other things, the predetermined orientation of each of a number of display screens. Accordingly, the operator can readily select the desired orientation in which the resulting visual image of the sonar system will be displayed. Accordingly, the operator can more readily customize the visual image of the sonar system based upon the operator's preferences.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
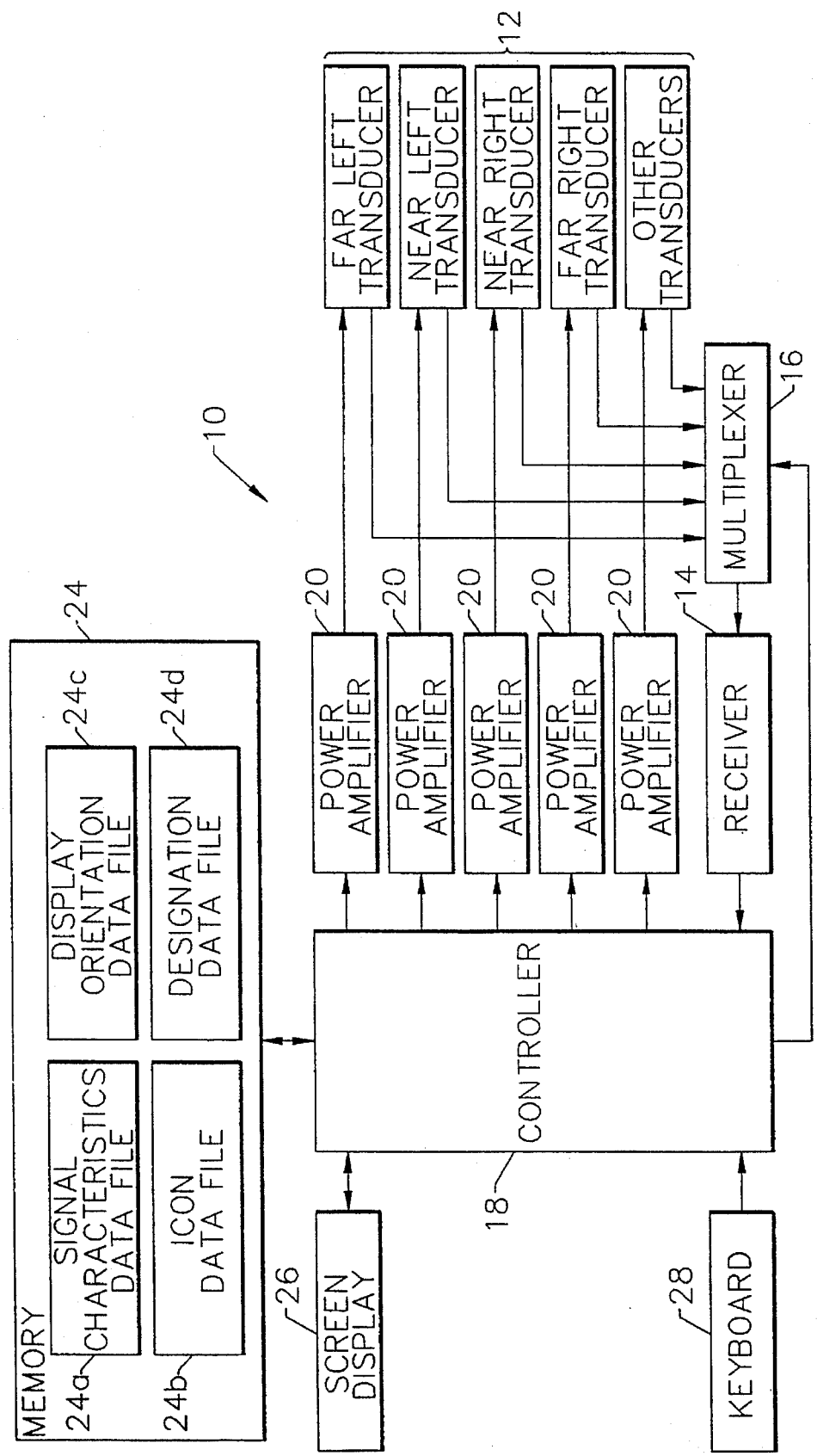
FIG. 1 is a block diagram of the components of a sonar system according to one embodiment of the present invention including a multiplexer for selecting the returning sonar signals to be processed by an associated receiver.

Referring now to FIG. 1, a block diagram of the sonar system 10 according to the present invention is shown. As illustrated, the sonar system includes at least one transducer 12 for emitting sonar signals toward the bottom surface of a body of water. According to one embodiment, the sonar system includes a plurality of transducers, each of which emits sonar signals having predetermined signal characteristics. These predetermined signal characteristics include a predetermined orientation i.e., a predetermined direction relative to the boat on which the sonar system is mounted, in which the sonar signals propagate.

For purposes of illustration, the transducers 12 are labeled "far left transducer", "near left transducer", "near right transducer" and "far right transducer" to designate the respective orientations of the transducers. For example, the far left transducer is mounted to emit sonar signals which propagate furthest to the left of the boat on which the sonar system 10 is mounted. As shown, the sonar system 10 can also include other transducers which are mounted to emit sonar signals which propagate in directions other than the far left, near left, near right or far right directions described above.

The predetermined signal characteristics of the sonar signals emitted by the transducers can also include the predetermined cone angle. As known to those skilled in the art, sonar transducers 12 typically emit sonar signals having a cone angle of about 8° or about 20°, for example. Further, the predetermined signal characteristics can include the frequency at which the sonar signals are emitted. As also known to those skilled in the art, sonar transducers typically emit sonar signals having frequencies of about 50 kHz, about 192 kHz, and about 384 kHz, for example.

As known to those skilled in the art, sonar transducers 12 not only emit sonar signals into a body of water, but also initially receive the returning sonar signals which have been reflected by objects in the body of water. The objects which reflect the sonar signals can include the bottom surface of the body of water and other submerged objects, such as fish and underwater structures. Although, the transducers initially receive the sonar signals, the sonar system 10 can also include receiver means for receiving and processing the returning sonar signals initially received by the transducers. The receiver means, in turn, can include a receiver 14 adapted to process the returning sonar signals initially received by the transducers. For example, the receiver can filter and amplify the signals and can convert the signals from analog to digital.

As also shown in FIG. 1, the receiver means can also include multiplexing means, such as a multiplexer 16, operably connected between the plurality of transducers 12 and the receiver 14. The multiplexing means selects the returning sonar signals which were initially received by at least one of the transducers for receipt by the receiver as shown in blocks 34 and 36 of FIG. 2A. For example, the multiplexer can initially route returning sonar signals received by the far left transducer to the receiver. The multiplexer can thereafter route returning sonar signals received by each of the other active transducers to the receiver in turn.

Accordingly, the sonar system 10 can include a common or universal receiver 14 for effectively receiving the returning sonar signals originally emitted by each of the plurality of transducers 12. However, the sonar system need not include multiplexing means as described above. Instead, the sonar system can include a plurality of receivers, a respective one of which is associated with each transducer, without departing from the spirit and scope of the present invention.

As illustrated in FIG. 1, the sonar system 10 can also include a controller 18, such as one or more microprocessors or microcontrollers, operably connected to the receiver 14.

Figure 2A:
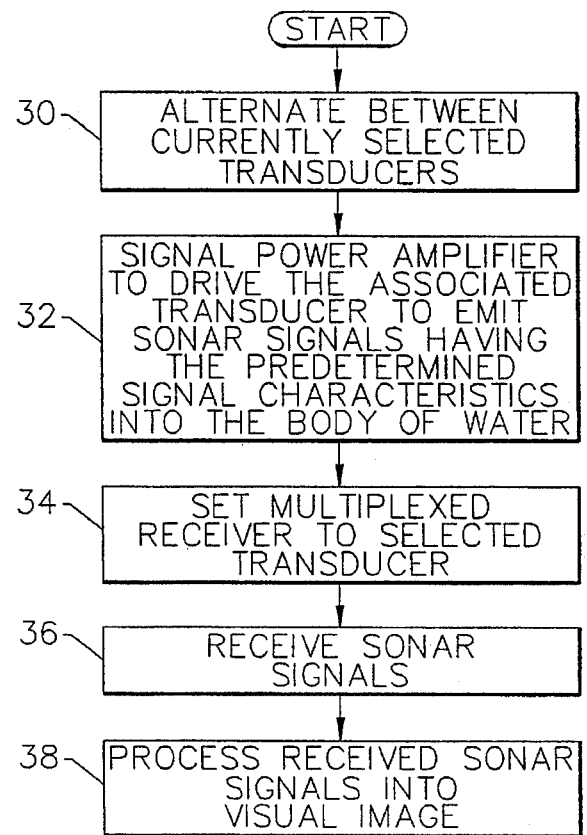
FIGS. 2A–2F are flow charts illustrating the detailed operations performed by the sonar system, including the interactive sonar viewing apparatus, of one embodiment of the present invention.

The controller processes the returning sonar signals received by the multiplexed receiver to generate echo data representative of the objects within the body of water which reflect the sonar signals as shown in block 38 of FIG. 2A.

As shown in FIG. 1, the controller 18 typically controls the operation of the transducers 12 via one or more power amplifiers 20. As illustrated in blocks 30 and 32 of FIG. 2A, the controller typically drives the selected transducers in an alternating manner such that only one transducer is activated at a time. While the steps of signaling the power amplifiers to drive the associated transducers and of configuring the receiver means to receive returning sonar signals from one or more transducers are shown as separate steps in FIG. 2A, these steps can be performed either simultaneously or in a different order without departing from the spirit and scope of the present invention.

In the illustrated embodiment, the sonar system 10 includes a plurality of power amplifiers 20, a respective one of which is associated with each transducer. Accordingly, the controller 18 can provide an activation signal to the power amplifier associated with the selected transducer. The power amplifier, in turn, amplifies the signal provided by the controller and provides the amplified signal to the associated transducer 12, thereby driving the associated transducer to emit sonar signals having the predetermined signal characteristics into the body of water. However, the sonar system need not include a plurality of power amplifiers, but can, instead, employ the controller to directly drive the transducers without departing from the spirit and scope of the present invention.

In addition, while a sonar system 10 which includes a plurality of transducers 12 which are alternately driven is described and illustrated herein, the sonar system can include other types or configurations of transducers without departing from the spirit and scope of the present invention. For example, the sonar system can include a phased array of transducers. In this embodiment, two or more transducers would typically be simultaneously driven in order to appropriately map the contour of the bottom surface of the body of water and to identify objects submerged therein as known to those skilled in the art.

According to the present invention, the sonar system 10 also includes an interactive sonar viewing apparatus 22, operably connected to the controller 18, for providing a visual image of the echo data generated by the controller. As described above, the echo data is representative of the objects within the body of water which reflect the sonar signals. For example, the interactive sonar viewing apparatus can provide a visual image of the contour of the bottom surface of the body of water as well as the relative locations of submerged objects, such as fish.

The sonar system 10 of the present invention typically operates in either a menu mode or a display mode. In display mode, the sonar system is operating so as to provide a visual image of objects within the body of water as described above. In contrast, the menu mode enables the operator to selectively configure the sonar system prior to or during operation and is described in detail below. Even in menu mode, however, the sonar system typically continues to operate so as to effectively map the contour of the bottom surface of the body of water and to identify objects submerged therein. Thus, as shown in block 40 of FIG. 2B, the sonar system and, more particularly, the controller 18 determines if the sonar system is in menu mode or display mode once the sonar system has been activated.

The sonar system 10 of the present invention can generate echo data representative of either a three-dimensional (3D)

or a two-dimensional (2D) visual image of the contour of the bottom surface of the body of water as well as objects submerged therein. Thus, if the sonar system is in display mode, the sonar system determines if the operator has selected that the visual image be a 2D, a 3D, or some other type of display, as shown in blocks 42, 44 and 46. If the visual image is to be 3D, the sonar system determines the selected orientation of the display frame and displays the 3D visual image representative of the historical echo data generated by the controller in the selected orientation as shown in blocks 60–72 of FIG. 2C. The process of selecting the orientation of the display frames will be described in detail hereinafter. Alternatively, if the visual image is to be 2D, the sonar system displays a 2D visual image representative of the historical echo data generated by the controller as shown in block 48 of FIG. 2B.

Figure 2B:
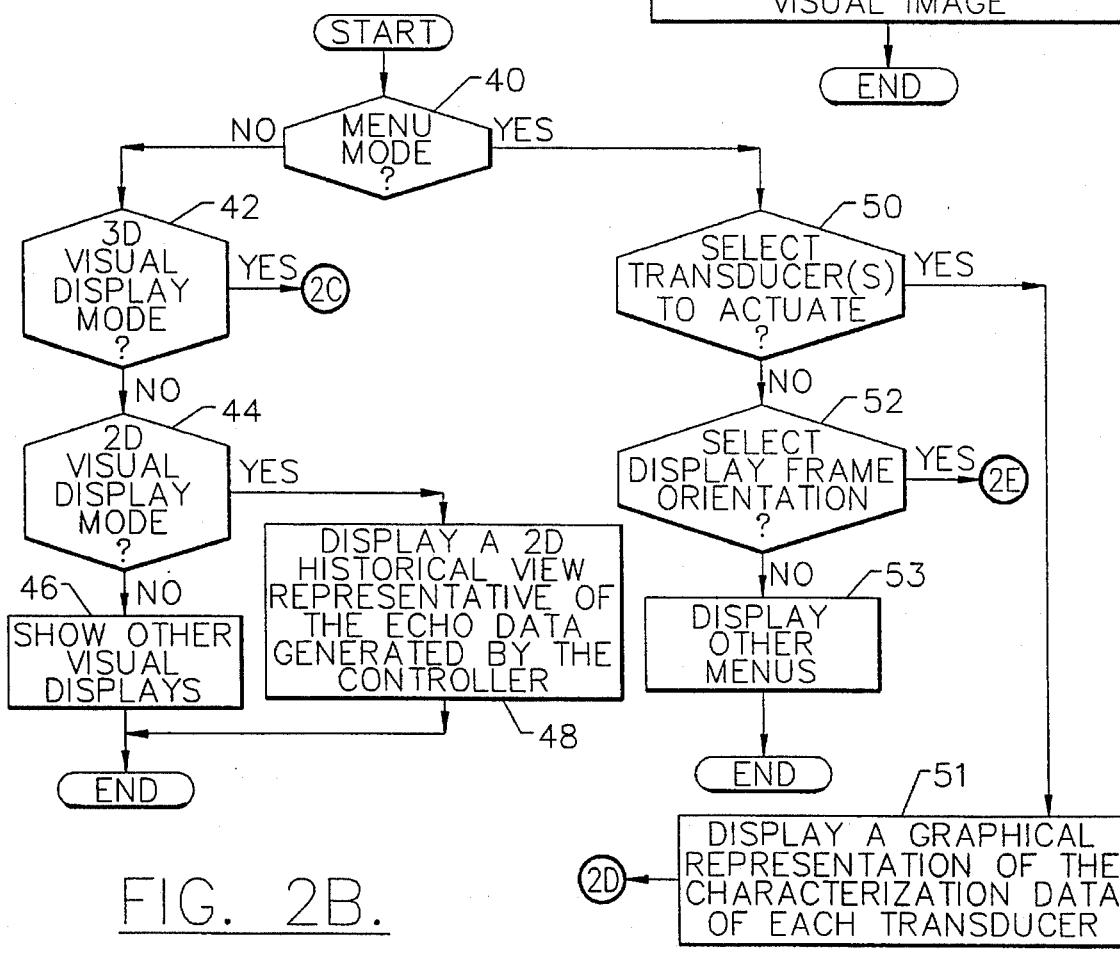
Figure 2C:
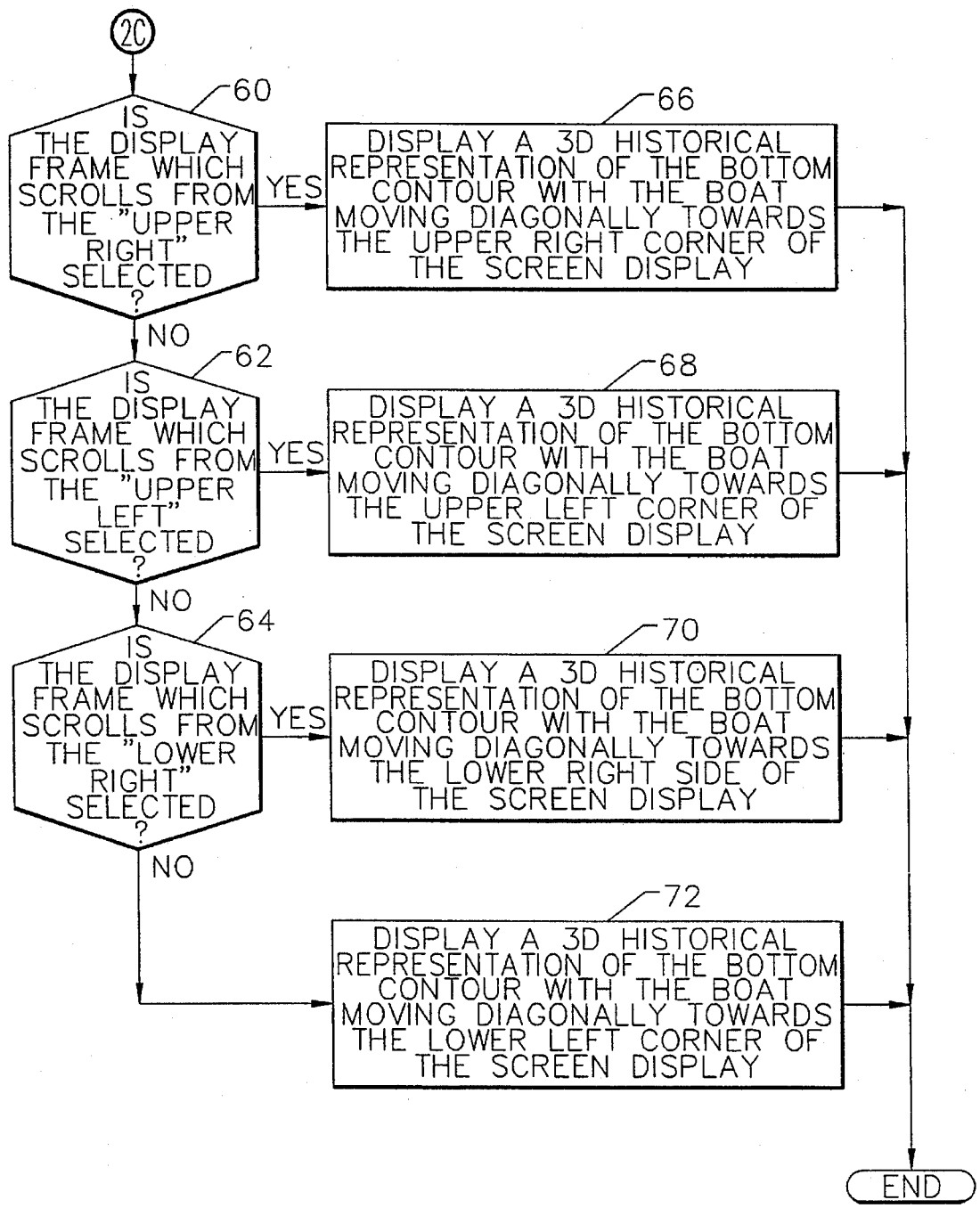

In menu mode, in contrast, the operator can select and initialize a number of features, including the orientation of the resulting visual image, the transducers 12 which will be active and a number of other features as shown in blocks 50, 52 and 53 of FIG. 2B. While the sonar system 10 described and illustrated provides operator selection of both these features, the sonar system could provide operator selection of either one of these features individually without departing from the spirit and scope of the present invention.

Figure 3A:
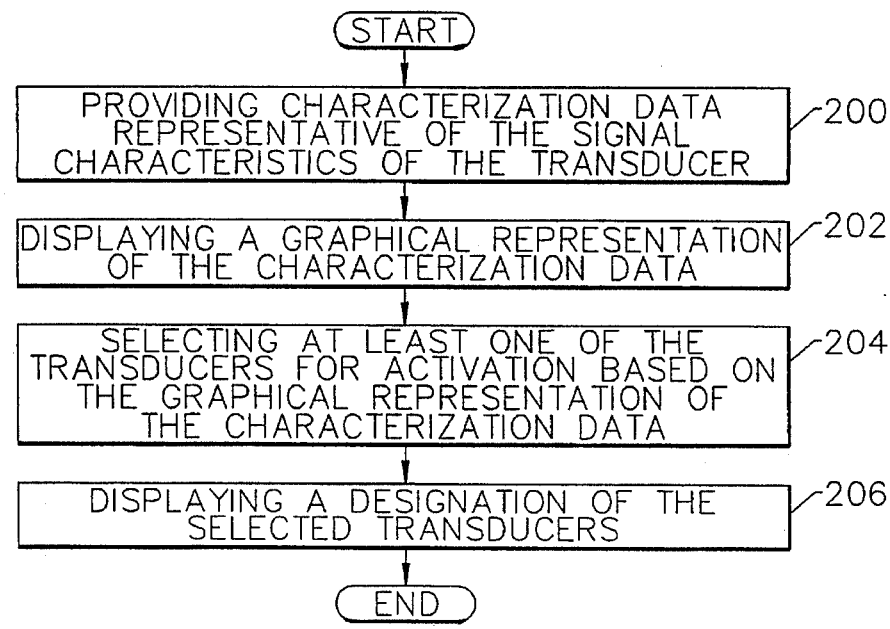
FIGS. 3A and 3B are flow charts illustrating the general operations performed by the sonar system during operator selection of the transducers to be activated and the orientation of the resulting visual images, respectively.

The interactive sonar viewing apparatus 22 of the embodiment of the present invention which provides operator selection of the active transducers 12 therefore includes signal characteristics storage means as shown in FIG. 3A. The signal characteristics storage means stores characterization data representative of the predetermined signal characteristics of the plurality of transducers. In one advantageous embodiment, the characterization data includes data representative of the predetermined orientation and predetermined cone angle of each of the transducers. In addition, the characterization data can include the frequency at which each of the transducers emits sonar signals as well as other signal characteristics associated with the transducers. Based upon the characterization data, the type of sonar signals emitted by each of the transducers and the coverage provided by each of the transducers is effectively defined.

The signal characteristic storage means can include a memory device 24, such as read only memory or random access memory, in which the characterization data is stored, such as in a signal characteristics data file 24a. The memory device in which the characterization data is stored can be either external to the controller 18, as shown in FIG. 1, or internal to the controller without departing from the spirit and scope of the present invention. As will be apparent to those skilled in the art, the characterization data can be stored in a variety of forms, including data representative of the ultimate graphical representation to be displayed which, in turn, illustrates the predetermined signal characteristics or data which directly relates to the signal characteristics and from which the graphical representation to be displayed is determined.

Figure 4:
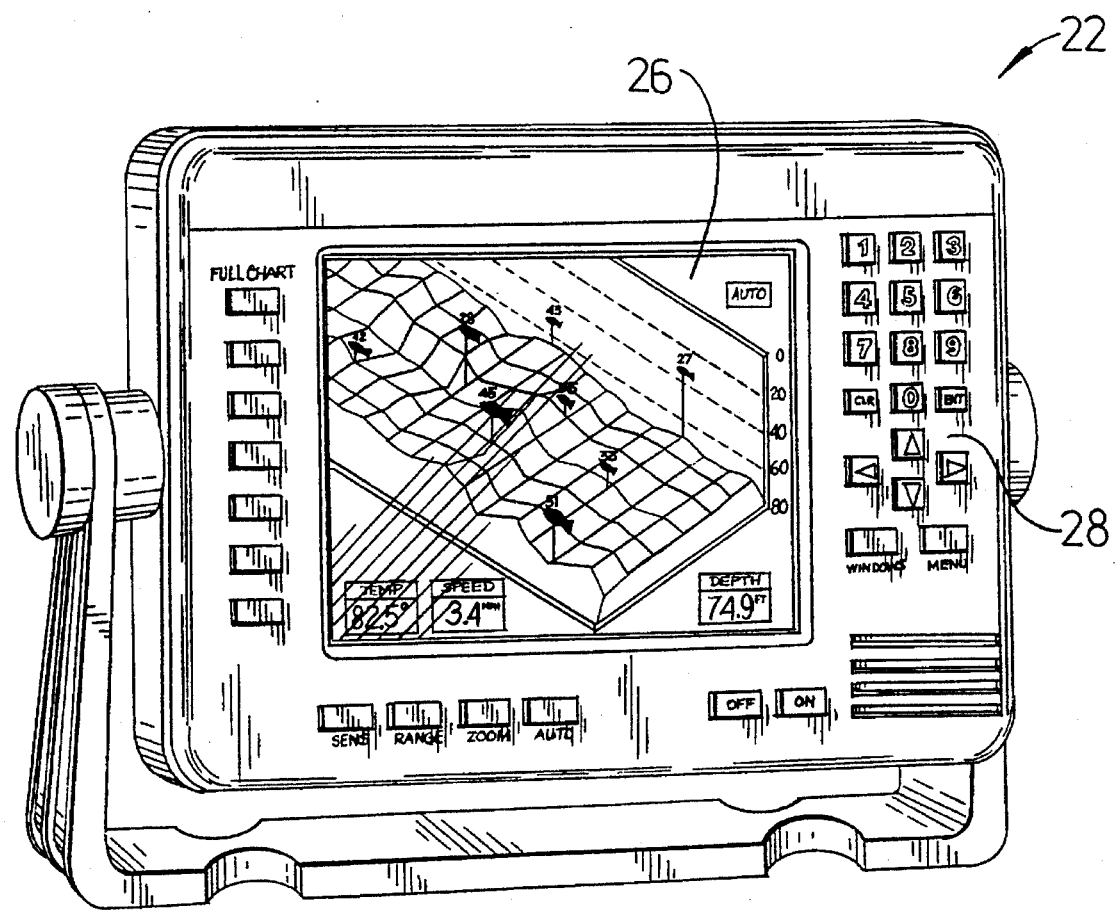
FIG. 4 is a perspective view of an interactive sonar viewing apparatus of a sonar system according to one embodiment of the present invention.

As shown in FIGS. 1 and 4 and, in more detail, in blocks 200 and 202 of FIG. 3A, the interactive sonar viewing apparatus of this embodiment of the present invention also includes a screen display 26, responsive to the signal characteristics storage means, for displaying a graphical representation of the characterization data. The screen display can be a liquid crystal display as illustrated in FIG. 4. However, the screen display can include a variety of other types of visual displays known to those skilled in the art, including cathode ray tubes, electroluminescent displays and LED displays.

Thus, if the sonar system 10 is in menu mode and the operator has chosen, typically by the depression of a predetermined key, to select the transducers 12 which will be activated, a graphical representation of the characterization data of the transducers is displayed by the screen display independent of the returning sonar signals or echo data generated therefrom, as shown in blocks 50 and 51 of FIG. 2B. Accordingly, the screen display can clearly display the coverage provided by the respective transducers as defined by the characterization data without extraneous, and potentially confusing, textual or graphical displays.

Figure 5A:
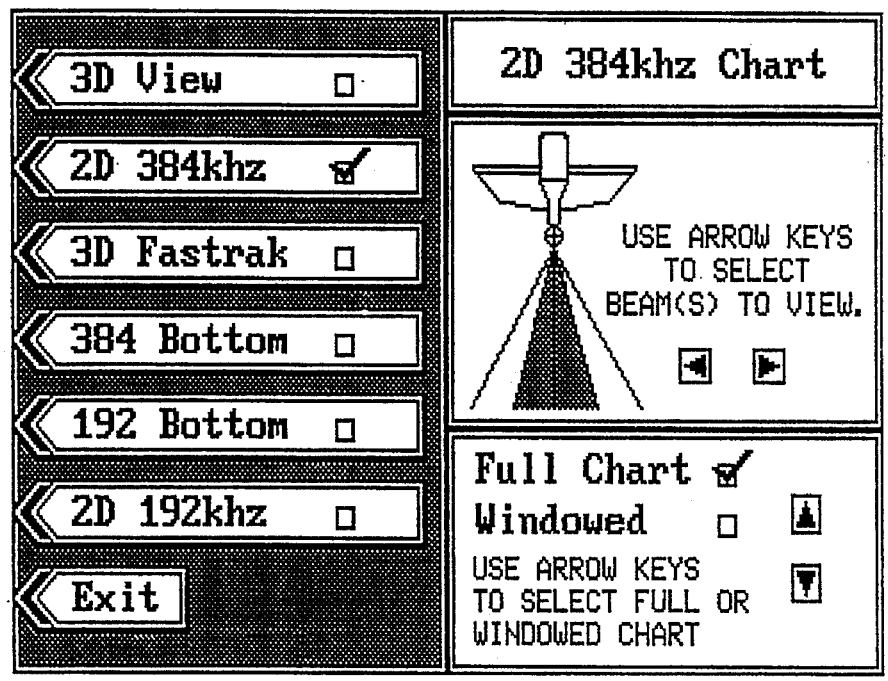
FIGS. 5A–5C illustrate display screens which are presented to an operator during the selection of the transducers to activate, according to one embodiment of the present invention.
Figure 5B:
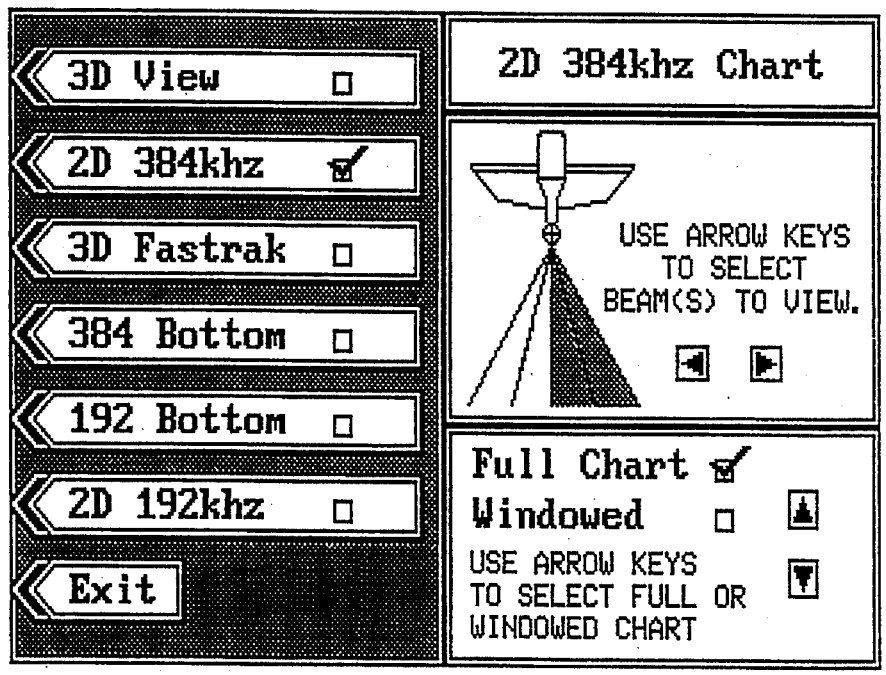
Figure 5C:
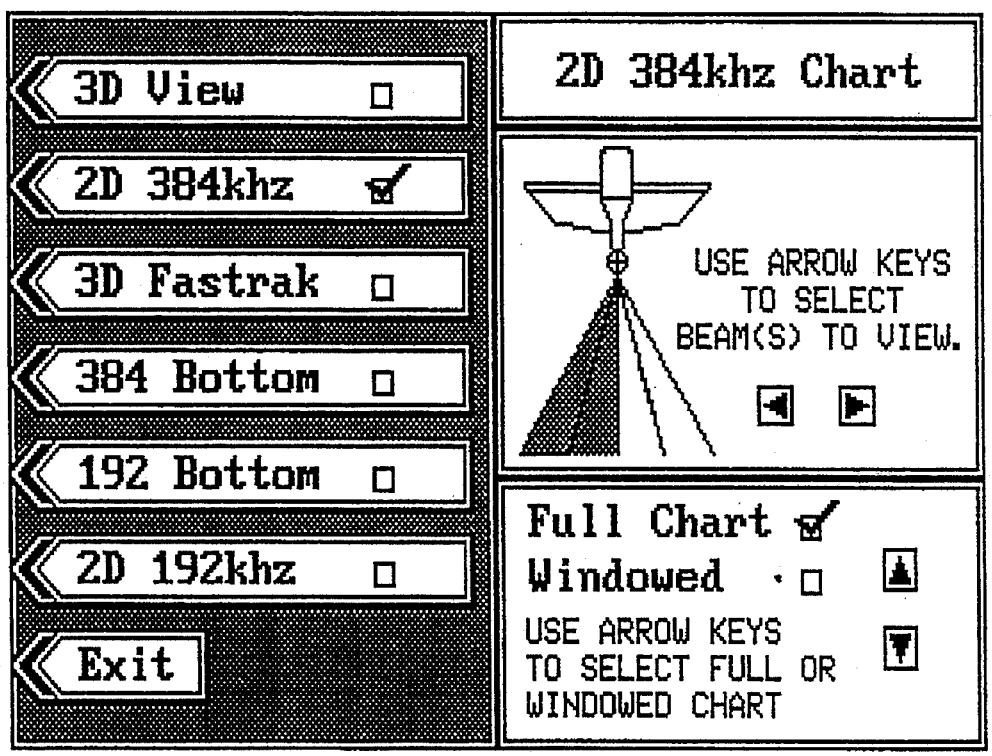

For purposes of illustration, one exemplary graphical representation of the characterization data is shown in FIGS. 5A–5C. As illustrated, the characterization data, including the predetermined orientation and predetermined cone angle, of the sonar signals emitted by each of four transducers are graphically represented by the downwardly diverging triangular regions. While a 2D graphical representation of the characterization data is depicted in FIGS. 5A–5C, the screen display could, instead, graphically represent the characterization data three-dimensionally or in other formats without departing from the spirit and scope of the present invention.

The interactive sonar viewing apparatus 22 of this embodiment also includes transducer selection means. The transducer selection means is operably connected to the controller 18 and is responsive to operator selection of at least one of the plurality of transducers 12 based upon the graphical representation of the characterization data by the screen display 26. As shown in FIGS. 1 and 4, the transducer selection means view can include a keypad 28. Accordingly, by depressing a predetermined key or key sequence, the operator can select one or more of the transducers based upon the graphical representation of the characterization data. For example, the operator can select the transducers designated as the far left transducer and the near left transducer; the transducers designated as the near left transducer and the near right transducer; the transducers designated as the near right transducer and the far right transducer; or other combinations of the transducers designated by the operator based upon the desired performance of the sonar system 10, including the selection of one, two, three or more transducers.

In the embodiment illustrated in FIGS. 1 and 4 and described above, the operator can select the desired transducers 12 as shown generally in block 204 of FIG. 3A by depressing the appropriate key or by entering the appropriate key sequence. However, the transducer selection means can also include other selection devices for providing operator selection of the transducers to the controller 18. For example, the transducer selection means can include a track ball, a light pen or other selection devices known to those skilled in the art.

Based upon the operator selection of the transducers 12, the controller 18 designates the selected transducers for activation, such that during operation of the sonar system 10, the controller will provide appropriate activation signals, via the respective power amplifiers 20, to the selected transducers such that the selected transducers alternately emit sonar signals having the predetermined signal characteristics into the body of water. By selecting the transducers to be activated based upon the graphical representation of the characterization data, the operator can selectively configure the sonar system to provide optimal performance.

Figure 2D:
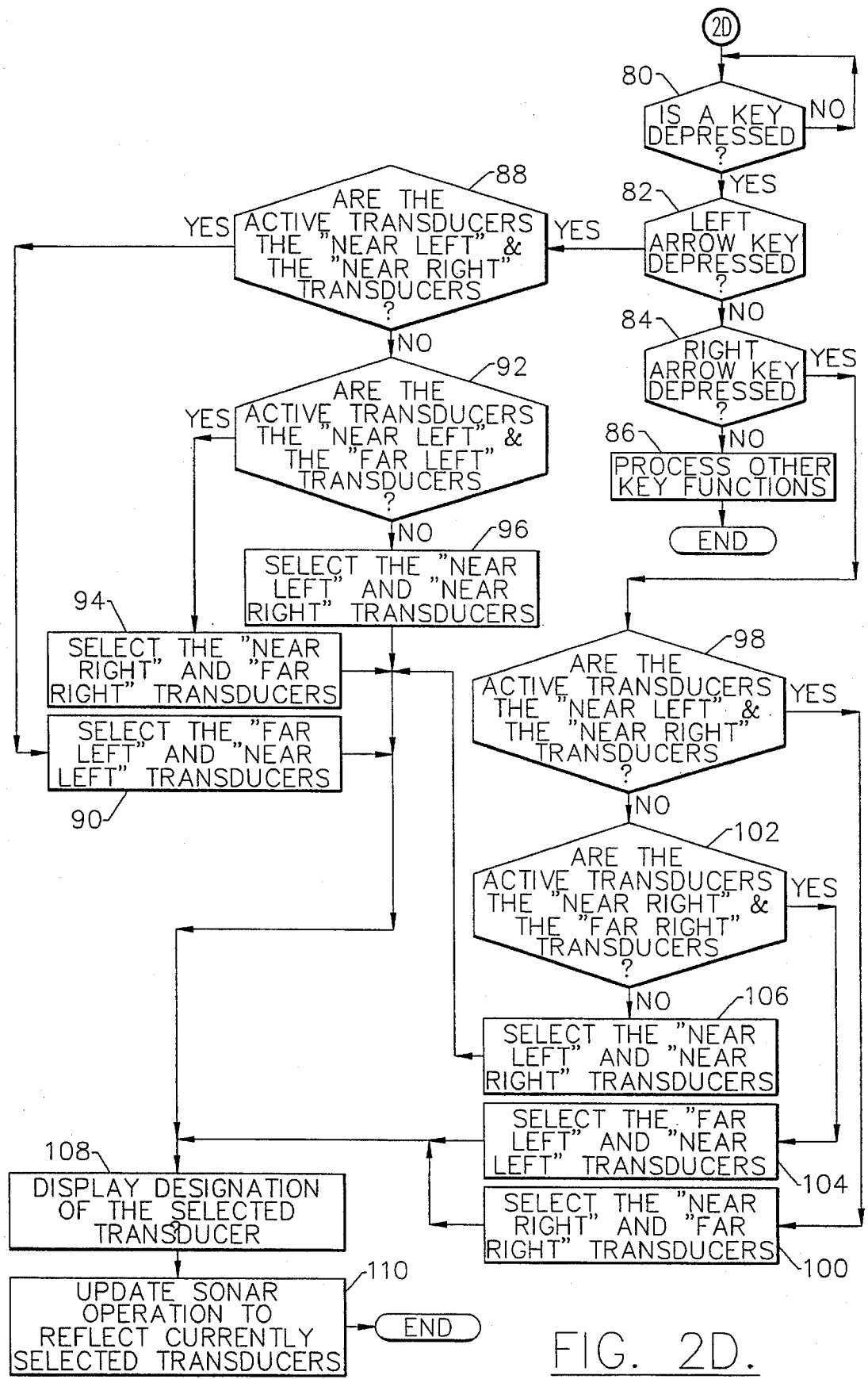

As illustrated in more detail in blocks 80, 82 and 84 of FIG. 2D, the sonar system 10 of the present invention monitors the actuation of the keys of the interactive sonar viewing apparatus 22 and, once a key is depressed, determines if a curser or arrow key was depressed. During this monitoring step, however, the sonar system 10 typically continues to operate so as to effectively map the contour of the bottom surface of the body of water and to identify objects submerged therein as described above. If the depressed key is not an arrow key, the sonar system performs the predefined function associated with the depressed key as shown in block 86. This function can include prompting the operator to make another selection. However, if an arrow key is depressed, the controller determines the specific arrow key which was depressed.

If the left arrow key was depressed, the controller 18 determines which transducers 12 were previously selected. If the previously selected transducers are the near left and near right transducers, the transducer selection means revises the selected transducers to be the far left and near left transducers as shown in blocks 88 and 90. If the previously selected transducers were the near left and far left transducers, instead, the transducer selection means updates the selected transducers to be the near right and far right transducers as shown in blocks 92 and 94. Otherwise, the transducer selection means updates the selected transducers to be the near left and near right transducers as shown in block 96, since the previously selected transducers were the far right and near right transducers.

Likewise, if the right arrow key was depressed, the controller 18 determines which transducers 12 were previously selected. If the previously selected transducers were the near left and near right transducers, the transducer selection means updates the selected transducers to be the far right and near right transducers as shown in blocks 98 and 100. If the previously selected transducers were the near right and far right transducers, instead, the transducer selection means updates the selected transducers to be the near left and far left transducers as shown in blocks 102 and 104. Otherwise, the transducer selection means updates the selected transducers to be the near left and near right transducers as shown in block 106, since the previously selected transducers were the far left and near left transducers. While a sonar system 10 having four transducers designated the far left, near left, near right and far right transducers is described and illustrated herein, the sonar system can include any number of transducers having a variety of designations without departing from the spirit and scope of the present invention.

The interactive sonar viewing apparatus 22 of this embodiment can also include transducer designation means. The transducer designation means is responsive to the transducer selection means and is operably connected to the screen display 26 for providing designation data representative of the selected transducers to the screen display. For example, the designation data can be stored in a designation data storage means, such as in a designation data file 24d within memory device 24, which is operably connected to the transducer designation means. According to this embodiment, the screen display is capable of concurrently displaying a graphical representation of both the designation data and the characterization data to thereby provide the operator with a visual image of the predetermined characteristics of the selected transducers as shown in block 108 of FIG. 2D and block 206 of FIG. 3A.

For example, in the display screens of FIGS. 5A–5C, the respective signal characteristics of each of the four transducers 12 are graphically represented. As shown in FIG. 5A, however, the graphical representation of the predetermined signal characteristics of the near left and near right transducers are shaded, thereby designating the near left and near right transducers as having been selected. As shown in FIGS. 5A–5C, the designation data of this embodiment includes data representative of shading which fills the downwardly diverging triangular regions defined by the predetermined signal characteristics of the selected transducers. As a further illustration, the display screen of FIG. 5B illustrates the selection and designation of the near right and far right transducers, while the display screen of FIG. 5C illustrates the selection and designation of the near left and far left transducers.

Accordingly, once the transducer selection has been updated by the transducer selection means, a graphical representation designating the selected transducers 12 can be provided by the screen display 26. As illustrated in block 110 of FIG. 2D, the transducer selection means also notifies the controller 18 of the selected transducers such that once the sonar system 10 is in operation the controller can provide appropriate signals, via the power amplifiers 20, to the selected transducers such that the selected transducers will emit sonar signals having the predetermined signal characteristics into the body of water.

The interactive sonar viewing apparatus 22 can also include icon storage means, such as memory device 24, for storing data representative of a reference icon, such as the icon of the boat on which the sonar system 10 is mounted, in an icon data file 24b, for example. According to this embodiment, the screen display 26 is capable of concurrently displaying a graphical representation of both the reference icon and the characterization data. For example, FIGS. 5A–5C provide exemplary graphical representations in which a reference icon and the characterization data are concurrently displayed.

By providing a concurrent graphical representation of both the reference icon and the characterization data, the operator is provided with a frame of reference with respect to the predetermined signal characteristics of the plurality of transducers 12. In other words, the operator can readily determine, by reference to the graphical representation, the relative orientations of the sonar signals emitted by each of the transducers without a complex textual description of the orientation of the sonar signals relative to the boat.

According to another embodiment of the present invention, the interactive sonar viewing apparatus 22 is adapted to graphically provide a visual image based upon the echo data generated by the controller in any of a number of different orientations. According to this embodiment, the interactive sonar viewing apparatus includes display orientation storage means, such as memory device 24, for storing orientation data representative of a plurality of display frames, such as in a display orientation data file 24c. In one advantageous embodiment, the orientation data includes data representative of a predetermined orientation of each display frame relative to the screen display 26.

According to this embodiment, each display frame typically includes a three-dimensional wire frame display which is oriented relative to the screen display 26 in a predetermined manner. For example, the display frame can be oriented so as to scroll from the lower right hand corner of the screen display to the upper left hand corner of the screen display such that the nearest objects are displayed at the lower right hand corner of the screen display and the more distant objects are displayed in the upper left hand corner of the display as shown in FIG. 6E. Alternatively, the display frame can be orientated to scroll in a variety of other predetermined orientations, such as from the upper left hand corner of the screen display toward the lower right hand corner of the screen display, from the lower left hand corner of the screen display toward the upper right hand corner of the screen display, from the upper right hand corner of the screen display toward the lower left hand corner of the screen display and directly toward or away from the operator. Additionally, the display frames can be oriented according to a variety of other orientations relative to the screen display without departing from the spirit and scope of the present invention.

Further, the sonar system 10 can include orientation means, such as a combination of the keyboard 28 and the controller 18, for allowing the operator to define additional orientations, different from the predetermined orientations described above. For example, the additional orientations can be defined by the angular displacement of the resulting visual image from a predetermined reference point relative to the screen display 26. The orientation data defining these additional orientations can be added to the display orientation storage means, if desired.

The screen display 26 of this embodiment is responsive to the display orientation storage means. Thus, if the sonar system 10 is in menu mode and the operator has chosen, typically by the depression of a predetermined key, to select the orientation of the resulting visual image, the screen display provides a graphical representation of the orientation data representative of the currently selected display frame as illustrated generally in blocks 210 and 212 of FIG. 3B and, in more detail, in block 52 of FIG. 2B and blocks 112–124 of FIG. 2E. The graphical representation displayed by the screen display includes a graphical representation of the predetermined orientation of the currently selected display frame.

Figure 6A:
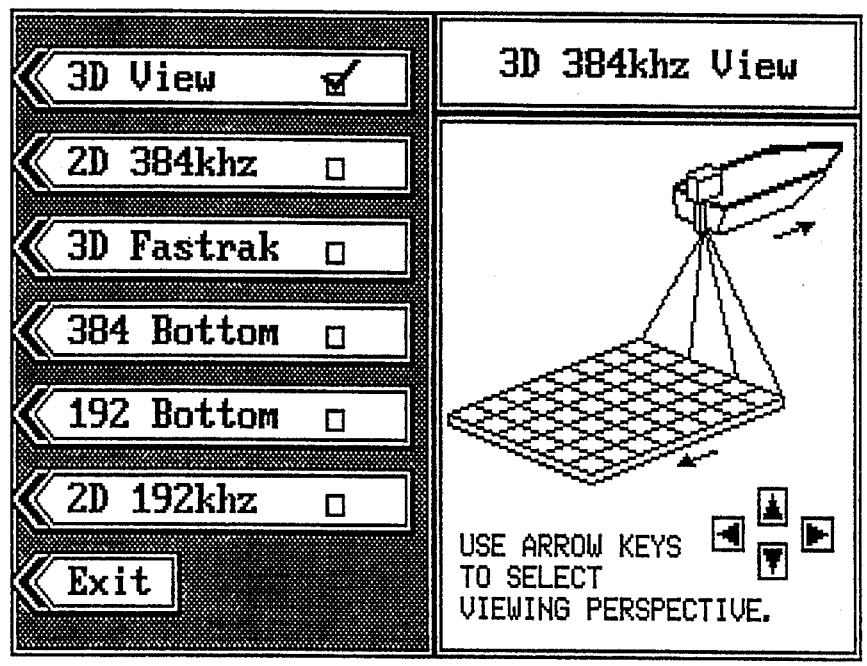
FIGS. 6A–6H illustrate display screens which are presented to an operator during orientation of the resulting visual image relative to the screen display, as well as exemplary visual images generated by the sonar system, according to one embodiment of the present invention.
Figure 6B:
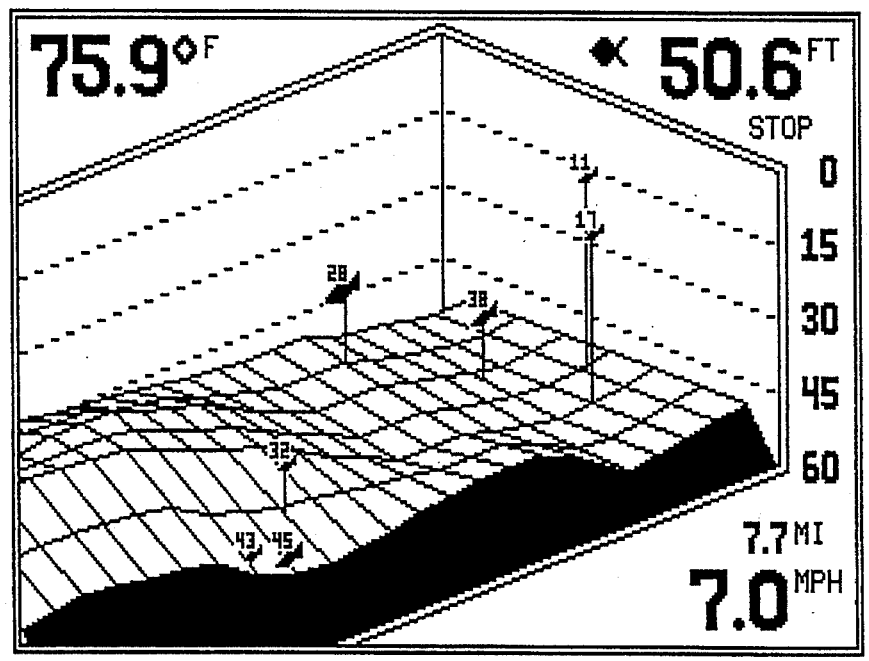

For example, a graphical representation of a display frame adapted to scroll from the upper right hand corner of the screen display 26 toward the lower left hand corner of the screen display is shown in FIG. 6A. For purposes of illustration, an exemplary visual image produced by the sonar system 10 which is oriented in this predetermined orientation is shown in FIG. 6B.

Figure 6C:
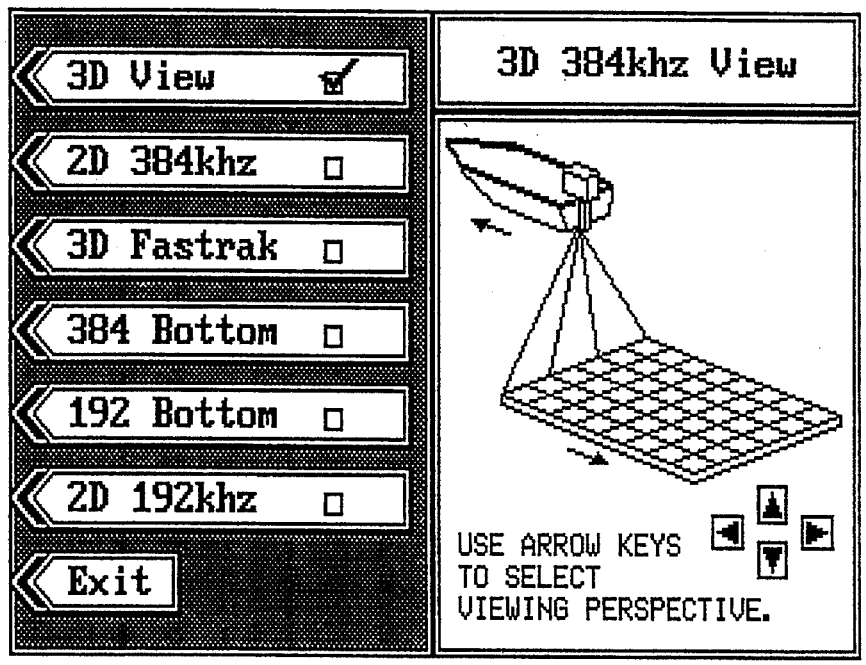
Figure 6D:
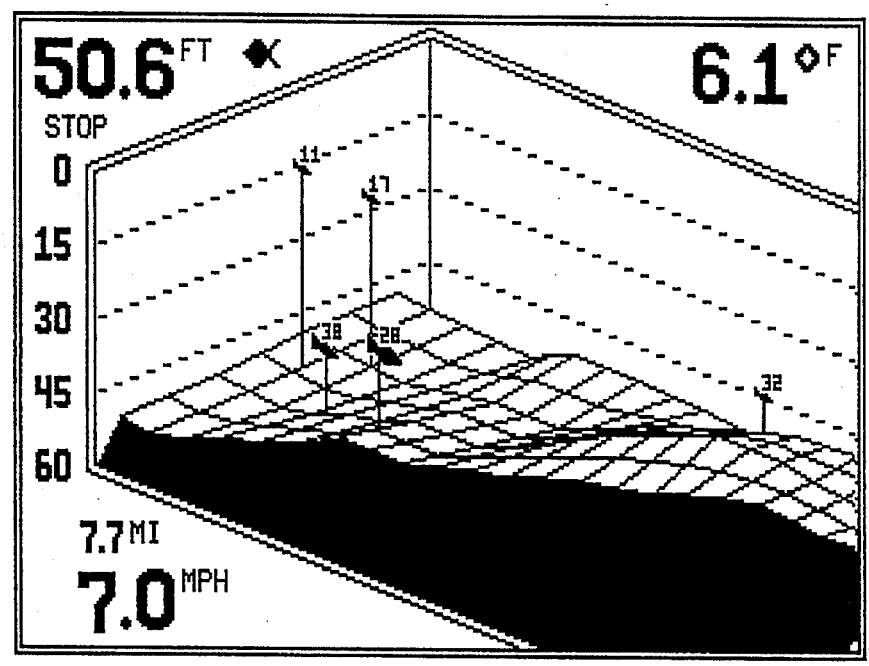
Figure 6E:
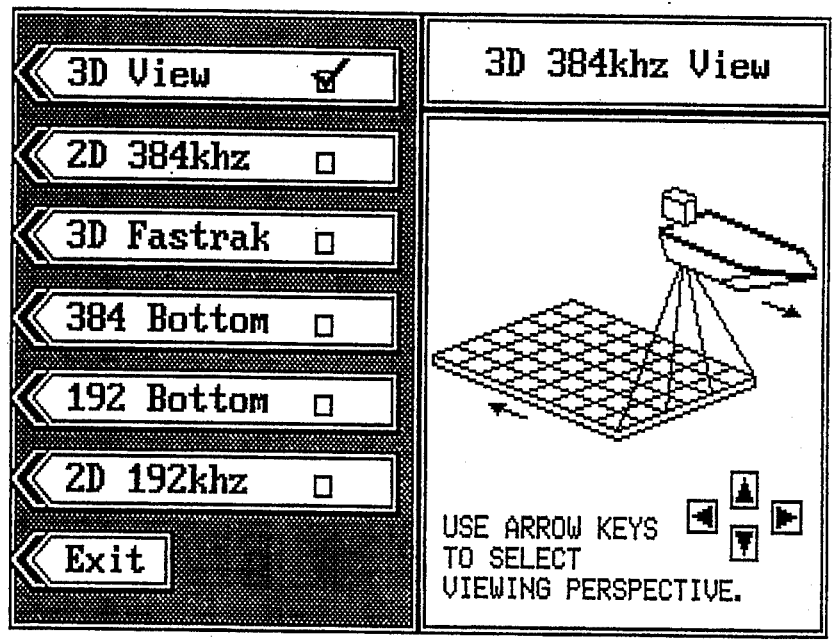
Figure 6F:
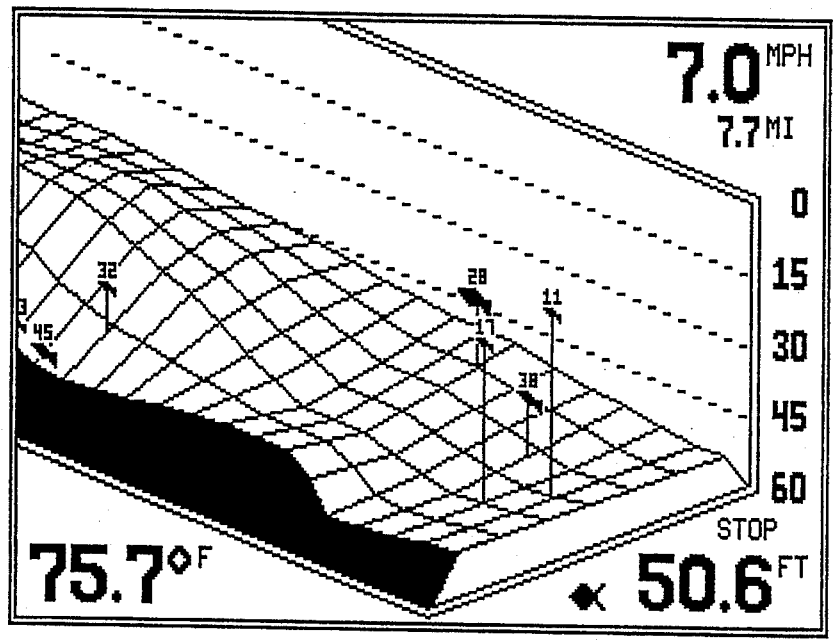
Figure 6G:
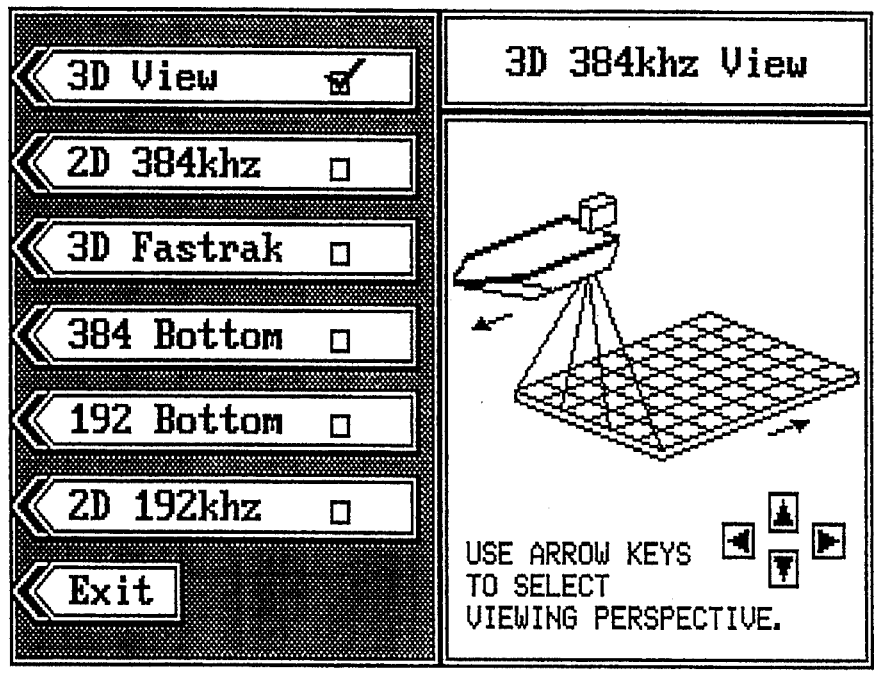
Figure 6H:
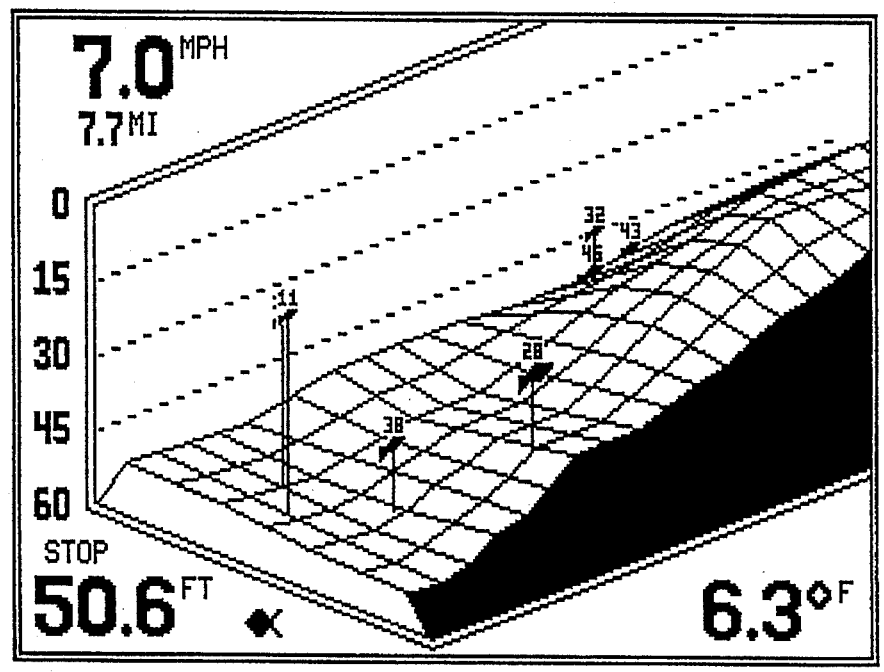

Likewise, the graphical representation of a display frame adapted to scroll from the upper left hand corner of the screen display 26 toward the lower right hand corner of the screen display is shown in FIG. 6C. Similarly, the graphical representation of a display frame adapted to scroll from the lower right hand corner of the screen display toward the upper left hand corner of the screen display is shown in FIG. 6E and the graphical representation of a display frame adapted to scroll from the lower left hand corner of the screen display toward the upper right hand corner of the screen display is shown in FIG. 6G. For purposes of illustration, exemplary visual images which are oriented in the predetermined orientations represented by the graphical representations FIGS. 6C, 6E and 6G are shown in FIGS. 6D, 6F and 6H, respectively.

Figure 7A:
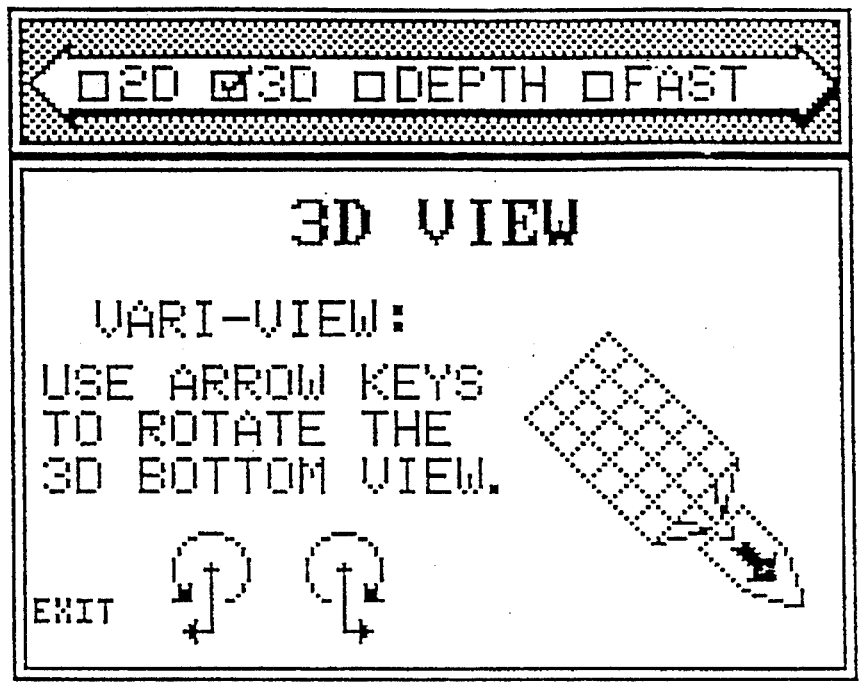
FIGS. 7A–7D illustrate display screens which are presented to an operator during orientation of the resulting visual image relative to the screen display of the sonar system, according to another embodiment of the present invention.
Figure 7B:
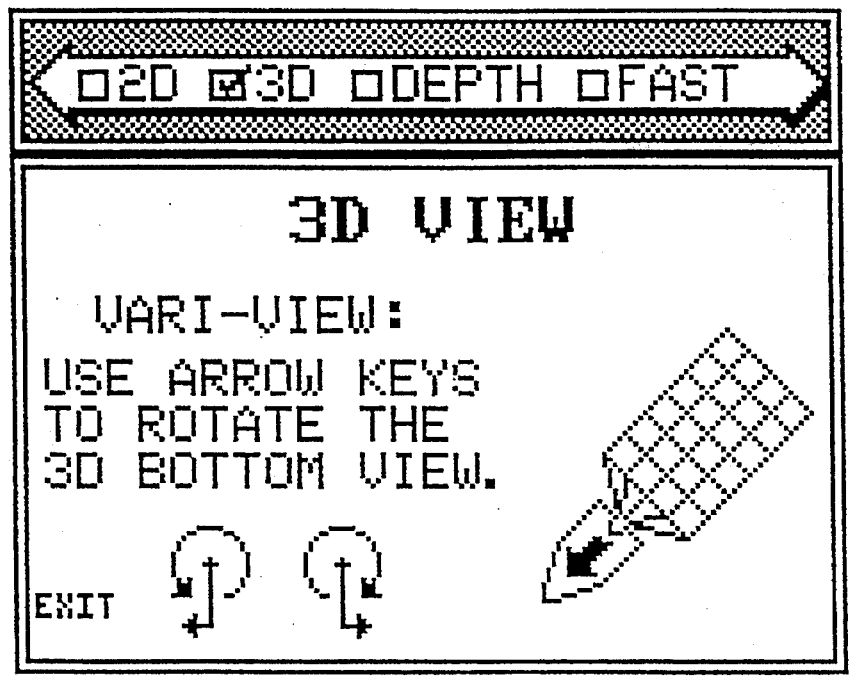
Figure 7C:
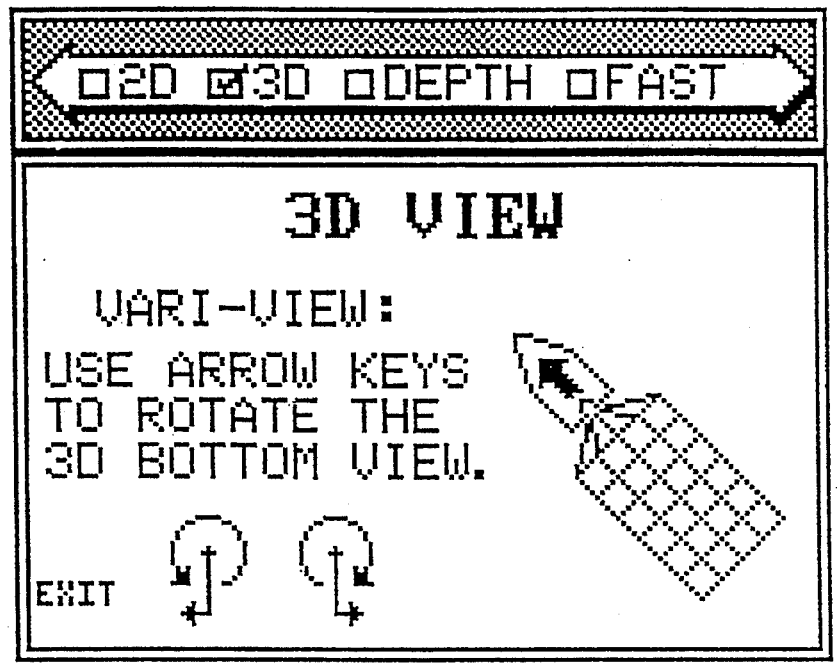
Figure 7D:
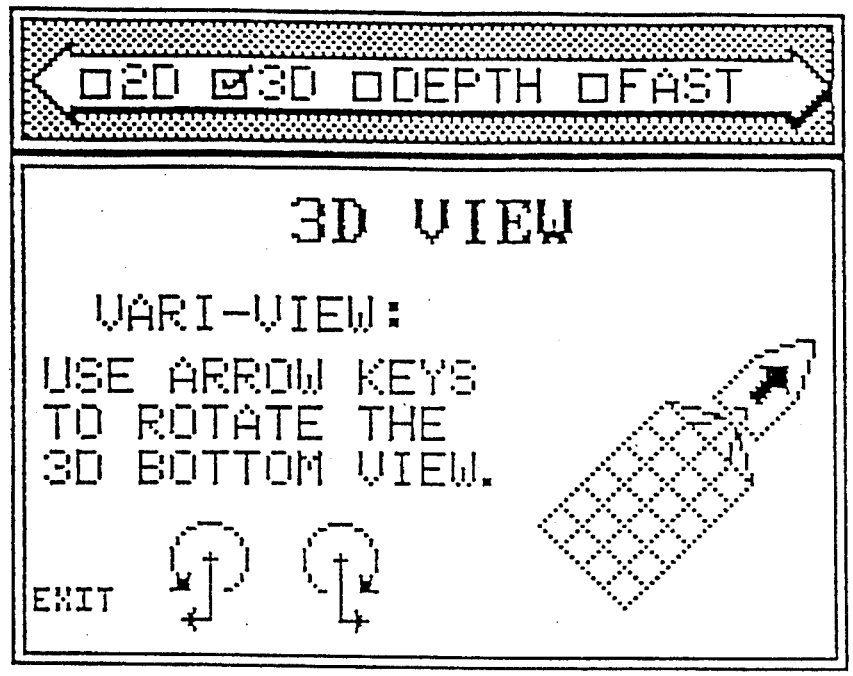

Furthermore, while a 3D graphical representation of the orientation data representative of the respective display frames is shown in FIGS. 6A, 6C, 6E and 6G, the orientation data can be displayed by the screen display 26 in a 2D graphical representation as shown in FIGS. 7A–7D. For example, the display frame of FIG. 7A is adapted to scroll from the lower right hand corner of the screen display toward the upper left hand corner of the screen display. Likewise, the display frame of FIG. 7B is adapted to scroll from the lower left hand corner of the screen display toward the upper right hand corner of the screen display. Similarly, the display frame of FIG. 7C is adapted to scroll from the upper left hand corner of the screen display toward the lower right hand corner of the screen display, and the display frame of FIG. 7D is adapted to scroll from the upper right hand corner of the screen display toward the lower left hand corner of the screen display. However, various other graphical representations of the orientation data can be provided by the interactive sonar viewing apparatus 22 and, more particularly, by the screen display 26 as described above without departing from the spirit and scope of the present invention.

Typically, the interactive sonar viewing apparatus 22 of this embodiment of the present invention is adapted to sequentially display the orientation data representative of each of the plurality of display frames. However, the screen display 26 can simultaneously display the orientation data representative of all or a number of the plurality of display frames, such as in a plurality of separate windows defined by the screen display, without departing from the spirit and scope of the present invention.

The interactive sonar viewing apparatus 22 of this embodiment also includes display orientation selection means. The display orientation selection means is operably connected to the controller 18 and is responsive to operator selection of a respective display frame based upon the graphical representation of the orientation data by the screen display 26. Accordingly, the display orientation selection means selects the orientation at which a visual image of the echo data generated by the controller will be graphically displayed on the screen display as shown generally in block 214 of FIG. 3B.

In the embodiment illustrated in FIGS. 1 and 4, the display orientation selection means can include a keypad 28 associated with the screen display 26. Accordingly, the operator can select the desired orientation of the resulting visual image by entering a predefined key sequence. However, the display orientation selection means can include a variety of other selection devices, including a track ball or a light pen without departing from the spirit and scope of the present invention.

Figure 2E:
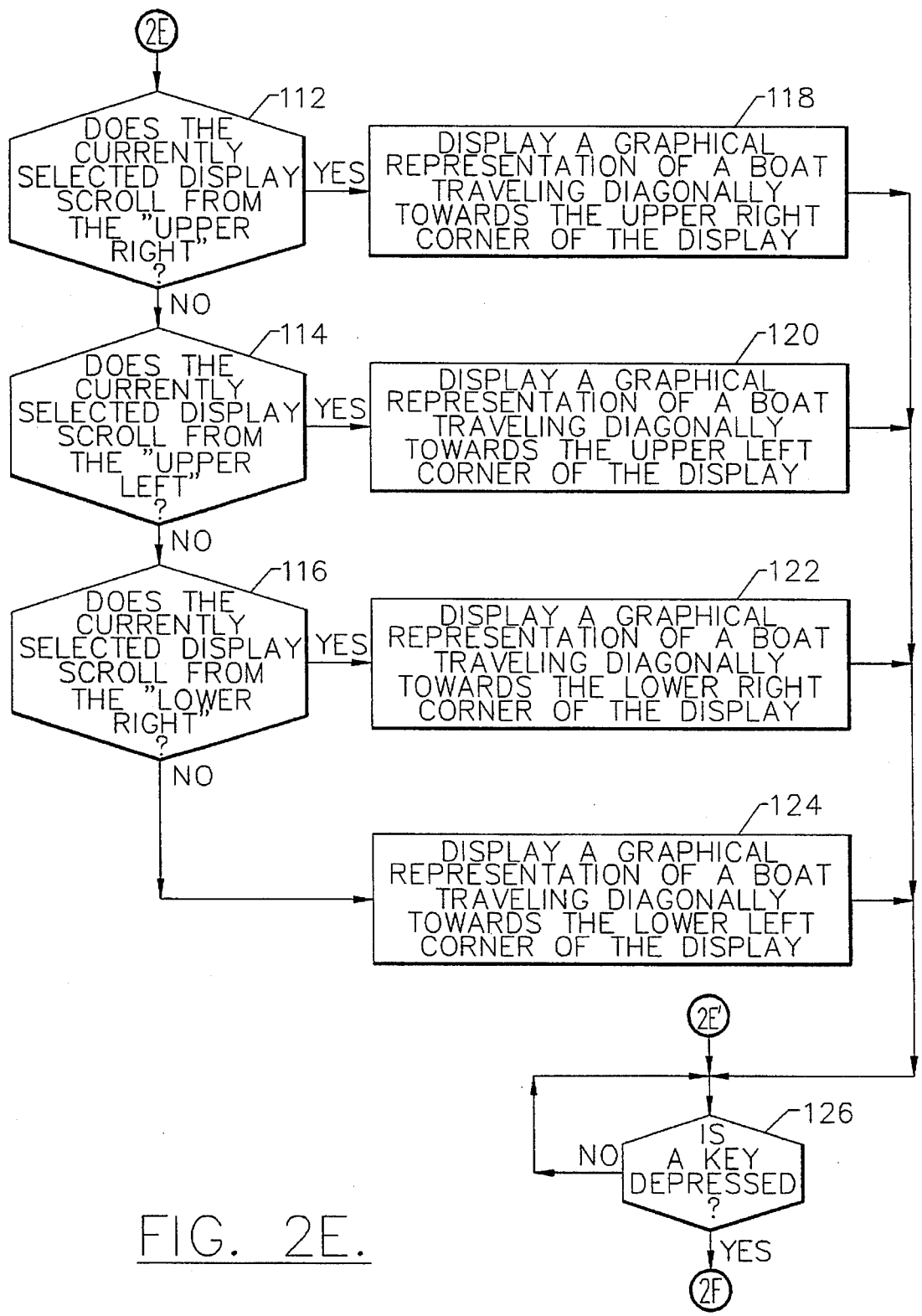

As also shown in block 126 of FIG. 2E, the sonar system 10 of the present invention monitors the actuation of the keys of the interactive sonar viewing apparatus 22 during the process of selecting the desired orientation of the resulting visual image and, once a key is depressed, determines if a cursor or arrow key was depressed. During this monitoring step, however, the sonar system typically continues to operate as described above. If the depressed key is not an arrow key, the sonar system 10 performs the predefined function associated with the depressed keys as illustrated in block 136. However, if the depressed key is an arrow key, the sonar system and, more particularly, the controller 18 determines which specific arrow key was depressed.

Figure 2F:
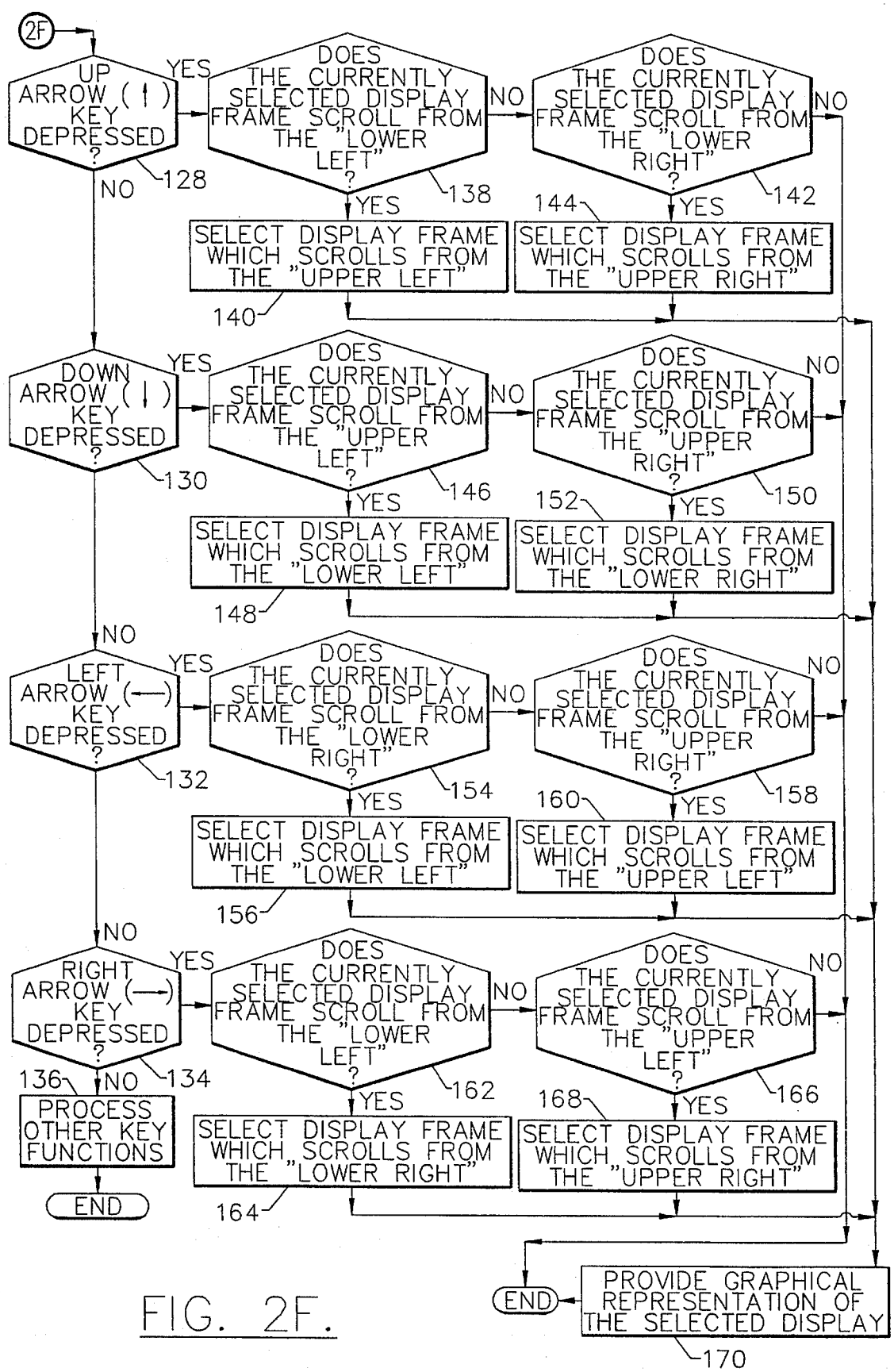

As illustrated in FIG. 2F, if the up arrow key was depressed, the controller 18 determines the orientation of the currently selected display frame. As explained above and as illustrated in FIG. 2E, the currently selected display frame is also graphically displayed by the screen display 26 to aid in the selection process. If the currently selected display frame is oriented to scroll from the lower left hand corner of the screen display toward the upper right hand corner of the screen display, the display orientation selection means selects the display frame oriented to scroll from the upper left hand corner of the screen display toward the lower right hand corner of the screen display as shown in blocks 138 and

140 of FIG. 2F. Alternatively, as illustrated in blocks 142 and 144, if the currently selected display frame is oriented to scroll from the lower right hand corner of the screen display toward the upper left hand corner of the screen display, the display orientation selection means selects the display frame oriented to scroll from the upper right hand corner of the screen display toward the lower left hand corner of the screen display.

Likewise, if the down arrow key was depressed as shown in block 130, the controller 18 also determines the orientation of the currently selected display frame. If the currently selected display frame is oriented to scroll from the upper left hand corner of the screen display 26 toward the lower right hand corner of the screen display, the display orientation selection means selects the display frame oriented to scroll from the lower left hand corner of the screen display toward the upper right hand corner of the screen display as shown in blocks 146 and 148. Alternatively, as illustrated in blocks 150 and 152, if the currently selected display frame is oriented to scroll from the upper right hand corner of the screen display toward the lower left hand corner of the screen display, the display orientation selection means selects the display frame oriented to scroll from the lower right hand corner of the screen display toward the upper left hand corner of the screen display.

Similarly, if the left arrow key was depressed as shown in block 132 of FIG. 2F, the controller 18 determines the orientation of the currently selected display frame. If the currently selected display frame is oriented to scroll from the lower right hand corner of the screen display 26 toward the upper left hand corner of the screen display, the display orientation selection means selects the display frame oriented to scroll from the lower left hand corner of the screen display toward the upper right hand lower of the screen display as shown in blocks 154 and 156. Alternatively, as illustrated in blocks 158 and 160, if the currently selected display frame is oriented to scroll from the upper right hand corner of the screen display toward the lower left hand corner of the screen display, the display orientation selection means selects the display frame oriented to scroll from the upper left hand corner of the screen display toward the lower right hand corner of the screen display.

Finally, if the right arrow key was depressed as illustrated in block 134, the controller 18 determines the orientation of the currently selected display frame. If the currently selected display frame is oriented to scroll from the lower left hand corner of the screen display 26 toward the upper right hand corner of the screen display, the display orientation selection means selects the display frame oriented to scroll from the lower right hand corner of the screen display toward the upper left hand corner of the screen display as shown in blocks 162 and 164. Alternatively, as illustrated in blocks 166 and 168, if the currently selected display frame is oriented to scroll from the upper left hand corner of the screen display toward the lower right hand corner of the screen display, the display orientation selection means selects the display frame adapted to scroll from the lower right hand corner of the screen display toward the upper left hand corner of the screen display.

Consequently, based upon the graphical representation of the orientation data, the operator can select the orientation in which the echo data generated by the controller 18 will be graphically displayed by the screen display 26. The operator can therefore selectively orient the resulting visual image of the sonar system 10. For example, the operator can select a display frame which is oriented at an angle at which the operator is accustomed to viewing usual images or at an angle which will more clearly depict the submerged objects of interest to the operator.

Figure 3B:
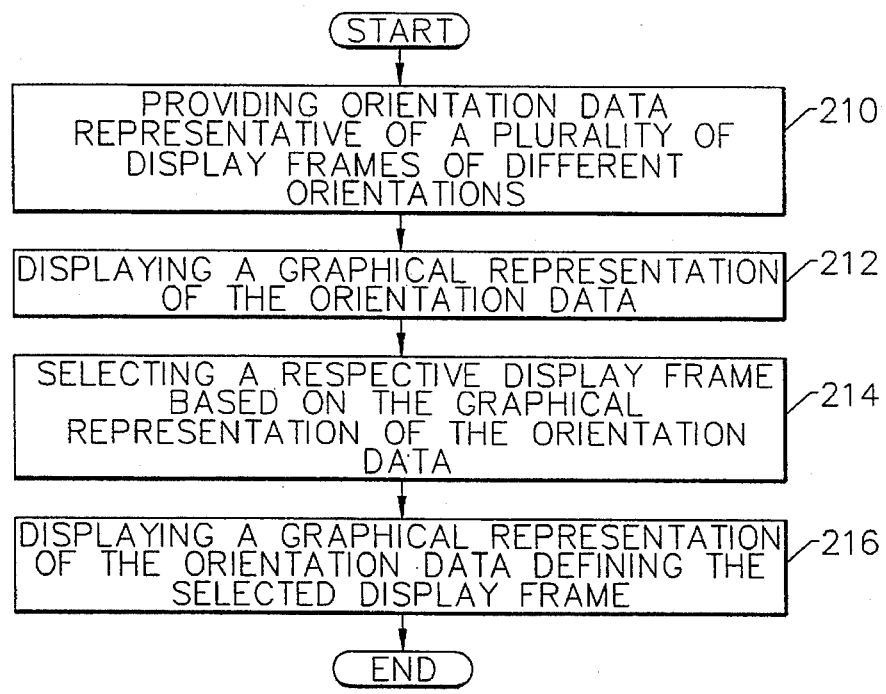

Following the selection of the orientation in which the echo data generated by the controller 18 is to be displayed, the display frame graphically represented by the screen display is updated to illustrate the newly selected display frame as shown generally in block 216 of FIG. 3B and, in more detail, in block 170 of FIG. 2F. However, if the currently selected display frame is oriented differently than the orientations described above and illustrated herein in conjunction with the depression of the up, down, left and right arrow keys, the sonar operations typically continue without altering the orientation of the resulting visual display since the depression of the particular arrow key was inappropriate for altering the currently selected display frame. However, the operator can be prompted to make another selection, such as by depressing another arrow key, without departing from the spirit and scope of the present invention. In addition, while operator selection of the various features is provided principally by actuation of the arrow keys in the illustrated embodiment, operator selection can be provided by actuation of other predefined keys or key sequences or by other selection devices as described above.

As described above in conjunction with the transducer selection process, the interactive sonar viewing apparatus 22 of this embodiment can also include icon storage means, such as memory device 24, for storing data representative of a reference icon, such as the icon of a boat. Accordingly, the screen display 26 is capable of concurrently displaying a graphical representation of both the reference icon and the orientation data. For example, graphical representations of both the reference icon and the orientation data are shown in FIGS. 6A–6H and 7A–7D. Accordingly, the operator is provided with a frame of reference with respect to the predetermined orientations of the plurality of display frames in order to facilitate the orientation selection.

The interactive sonar viewing apparatus 22 of this embodiment can also include signal characteristic storage means for storing characterization data representative of predetermined signal characteristics of the transducers 12 as described above. According to this embodiment, the screen display 26 is capable of concurrently displaying a graphical representation of both the characterization data and the orientation data so as to provide the operator with a graphical representation of the coverage provided by the transducers. Thus, the operator can effectively select both the desired orientation of the resulting visual display and the transducers to be activated based upon the graphical representation of both the characterization data and the orientation data.

For example, as illustrated in FIGS. 6A, 6C, 6E and 6G, the predetermined orientation and predetermined cone angle of each of four transducers is graphically represented along with a graphical representation of the orientation data. As shown in FIGS. 6A, 6C, 6E and 6G, the predetermined signal characteristics of each respective transducer can be depicted in alternative manners to that shown in FIGS. 5A–5C. In particular, the predetermined orientation and predetermined cone angle of each respective transducer can be represented by a centerline which generally extends in the direction in which the sonar signals emitted by the respective transducer travel.

According to the present invention, the sonar system 10 and, more particularly, the interactive sonar viewing apparatus 22 provides graphical representations of various features provided by the sonar system in order to facilitate operator selection of the desired features. For example, the interactive sonar viewing apparatus of one embodiment of the present invention graphically displays characterization data representative of the predetermined signal characteristics of the transducers 12 in order to facilitate operator selection of the specific transducers to be activated. Accordingly, the operator can more readily optimize the performance of the sonar system. According to another embodiment, the interactive sonar viewing apparatus displays a graphical representation of orientation data representative of, among other things, the predetermined orientation of each of a number of display frames relative to the screen display 26. Thus, the operator can readily select the desired orientation in which the resulting visual image of the sonar system will be displayed. Accordingly, the operator can more readily customize the sonar system based upon the operator's preferences.

In the drawings and the specification, there has been set forth preferred embodiments of the invention, and, although specific terms are employed, the terms are used in a generic and descriptive sense only and not for the purpose of limitation, the scope of the invention being set forth in the following claims.

That which is claimed is:

1. A reconfigurable sonar system comprising:
    a plurality of transducers for emitting sonar signals through a body of water and for receiving returning sonar signals reflected by objects within the body of water, wherein each respective transducer has predetermined signal characteristics;
    a controller, operably connected to said transducers, for processing the returning sonar signals to generate echo data representative of the reflected sonar signals; and
    an interactive sonar viewing apparatus operably connected to said controller, said interactive sonar viewing apparatus comprising:
        signal characteristics storage means for storing characterization data representative of the predetermined signal characteristics of said plurality of transducers;
        a screen display, responsive to said signal characteristics storage means, for displaying a graphical representation of the characterization data representative of the predetermined signal characteristics of said plurality of transducers independent of the echo data generated by said controller; and
        transducer selection means, operably connected to said controller and responsive to operator selection of at least one of said plurality of transducers based upon the graphical representation of the characterization data by said screen display, for selecting the transducers to activate such that the operator can thereby selectively reconfigure the sonar system.

2. A reconfigurable sonar system according to claim 1 wherein the predetermined signal characteristics include a predetermined orientation and a predetermined cone angle, and wherein said signal characteristics storage means stores characterization data representative of the predetermined orientation and predetermined cone angle of said plurality of transducers.

3. A reconfigurable sonar system according to claim 1 wherein said interactive sonar viewing apparatus further comprises icon storage means for storing data representative of a reference icon, and wherein said screen display is capable of concurrently displaying the reference icon and the characterization data to thereby provide the operator with a frame of reference with respect to the predetermined signal characteristics of said plurality of transducers.

4. A reconfigurable sonar system according to claim 1 wherein said interactive sonar viewing apparatus further comprises transducer designation means, responsive to said transducer selection means and operably connected to said screen display, for providing designation data representative of the selected transducers to said screen display and wherein said screen display is capable of concurrently displaying the designation data and the characterization data to thereby provide the operator with a visual display of the predetermined signal characteristics of the selected transducers.

5. A reconfigurable sonar system according to claim 1 further comprising receiver means, operably connected to said plurality of transducers, for receiving sonar signals initially received by said transducers.

6. A reconfigurable sonar system according to claim 5 wherein said receiver means further comprises:
    a receiver, operably connected to said controller, for processing the returning sonar signals; and
    multiplexing means, operably connected between said plurality of transducers and said receiver, for selecting the returning sonar signals initially received by at least one of said plurality of transducers for processing by said receiver.

7. An interactive sonar viewing apparatus for selectively configuring an associated sonar system having a plurality of transducers for emitting sonar signals through a body of water and receiving returning sonar signals reflected by objects within the body of water, wherein each respective transducer has predetermined signal characteristics, the interactive sonar viewing apparatus comprising:
    signal characteristics storage means for storing characterization data representative of the predetermined signal characteristics of the plurality of transducers;
    a screen display, responsive to said signal characteristics storage means, for displaying a graphical representation of the characterization data representative of the predetermined signal characteristics of the plurality of transducers independent of the returning sonar signals; and
    transducer selection means, operably connected to said signal characteristics storage means and responsive to operator selection of at least one of the plurality of transducers based upon the graphical representation of the characterization data by said screen display, for selecting the transducers to activate such that the operator can thereby selectively configure the associated sonar system.

8. An interactive sonar viewing apparatus according to claim 7 wherein the predetermined signal characteristics include a predetermined orientation and a predetermined cone angle, and wherein said signal characteristics storage means stores characterization data representative of the predetermined orientation and predetermined cone angle of said plurality of transducers.

9. An interactive sonar viewing apparatus according to claim 7 further comprising icon storage means for storing data representative of a reference icon, and wherein said screen display is capable of concurrently displaying the reference icon and the characterization data to thereby provide the operator with a frame of reference with respect to the predetermined signal characteristics of the plurality of transducers.

10. An interactive sonar viewing apparatus according to claim 7 further comprising transducer designation means, responsive to said transducer selection means and operably connected to said screen display, for providing designation data representative of the selected transducers to said screen display, and wherein said screen display is capable of concurrently displaying a graphical representation of both the designation data and the characterization data to thereby provide the operator with a visual display of the predetermined signal characteristics of the selected transducers.

11. A sonar system capable of selectively orienting a resulting visual image, the sonar system comprising:

at least one transducer for emitting sonar signals through a body of water and for receiving returning sonar signals reflected by objects within the body of water;

a controller, operably connected to said transducers, for processing the returning sonar signals to generate echo data representative of the reflected sonar signals; and an interactive sonar viewing apparatus operably connected to said controller, said interactive sonar viewing apparatus comprising:
display orientation storage means for storing orientation data representative of a plurality of display frames of different orientations;
a screen display, responsive to said display orientation storage means, capable of displaying a graphical representation of the orientation data representative of the plurality of display frames; and
display orientation selection means, operably connected to said controller and responsive to operator selection of a respective display frame based upon the graphical representation of the orientation data, for selecting the orientation in which the echo data generated by said controller will be graphically displayed such that the operator can thereby selectively orient the resulting visual image on said screen display of the sonar system.

12. A sonar system according to claim 11 wherein said display orientation storage means stores orientation data representative of the predetermined orientation of each display frame, and wherein said screen display provides a graphical representation of the respective predetermined orientations of the plurality of display frames.

13. A sonar system according to claim 11 wherein said interactive sonar viewing apparatus further comprises icon storage means for storing data representative of a reference icon, and wherein said screen display is capable of concurrently displaying the reference icon and the orientation data to thereby provide the operator with a frame of reference with respect to the predetermined orientations of the plurality of display frames.

14. A sonar system according to claim 11 wherein said interactive sonar viewing apparatus further comprises signal characteristics storage means for storing characterization data representative of the predetermined signal characteristics of said at least one transducer, and wherein said screen display is capable of concurrently displaying a graphical representation of both the characterization data and the orientation data to thereby provide the operator with a graphical representation of the coverage provided by the at least one transducer.

15. A sonar system according to claim 11 wherein said at least one transducer comprises a plurality of transducers, and wherein the sonar system further comprises receiver means, operably connected to said plurality of transducers, for receiving returning sonar signals initially received by said transducers.

16. A sonar system according to claim 15 wherein said receiver means further comprises:

a receiver, operably connected to said controller, for processing the returning sonar signals; and multiplexing means, operably connected between said plurality of transducers and said receiver, for selecting the returning sonar signals originally emitted by at least one of said plurality of transducers for receipt by said receiver.

17. An interactive sonar viewing apparatus for selectively orienting the visual image of an associated sonar system, the interactive sonar viewing apparatus comprising:

display orientation storage means for storing orientation data representative of a plurality of display frames of different orientations;

a screen display, responsive to said display orientation storage means, capable of displaying a graphical representation of the orientation data representative of the plurality of display frames; and display orientation selection means, operably connected to said display orientation storage means and responsive to operator selection of a respective display frame based upon the graphical representation of the orientation data, for selecting the orientation in which the visual display of the associated sonar system will be graphically displayed such that the operator can thereby selectively orient the resulting visual image on said screen display.

18. An interactive sonar viewing apparatus according to claim 17 wherein said display orientation storage means stores orientation data representative of the predetermined orientation of each display frame, and wherein said screen display provides a graphical representation of the respective predetermined orientations of the plurality of display frames.

19. An interactive sonar viewing apparatus according to claim 17 further comprising icon storage means for storing data representative of a reference icon, and wherein said screen display is capable of concurrently displaying the reference icon and the orientation data to thereby provide the operator with a frame of reference with respect to the predetermined orientations of the plurality of display screens.

20. An interactive sonar viewing apparatus according to claim 17 wherein the associated sonar system includes at least one transducer for emitting sonar signals through a body of water and for receiving returning sonar signals reflected by objects within the body of water, the interactive sonar viewing apparatus further comprising signal characteristics storage means for storing characterization data representative of the predetermined signal characteristics of the at least one transducer, and wherein said screen display is capable of concurrently displaying the characterization data and the orientation data to thereby provide the operator with a visual display of the coverage provided by the at least one transducer.

21. A method of selectively reconfiguring a sonar system having a plurality of transducers for emitting sonar signals and for receiving returning sonar signals wherein the transducers have predetermined signal characteristics, the method comprising the steps of:

providing characterization data representative of the predetermined signal characteristics of the plurality of transducers of the sonar system;

displaying a graphical representation of the characterization data representative of the predetermined signal characteristics of the plurality of transducers independent of the returning sonar signals; and selecting, based upon the graphical representation of the characterization data, at least one of the plurality of transducers for activation so as to emit sonar signals having the predetermined signal characteristics into a body of water.

22. A method according to claim 21 wherein said providing step further comprises the step of providing characterization data representative of a predetermined orientation and a predetermined cone angle of the plurality of transducers.

23. A method according to claim 21 further comprising the steps of:

providing data representative of a reference icon; and displaying the reference icon concurrent with said step of displaying the characterization data to thereby provide the operator with a frame of reference with respect to the predetermined signal characteristics of the plurality of transducers.

24. A method according to claim 21 further comprising the step of displaying a predetermined designation of the selected transducers, following said selecting step, while continuing to display the characterization data of the plurality of transducers to thereby provide the operator with a visual display of the predetermined signal characteristics of the selected transducers.

25. A method according to claim 21 wherein said displaying step comprises the step of displaying a graphical representation of the coverage provided by the plurality of transducers as defined by the characterization data.

26. A method of selectively orienting a visual image of a sonar system, the method comprising the steps of:

providing orientation data representative of a plurality of display frames of different orientations;

displaying a graphical representation of the orientation data representative of at least one display frame on the screen display; and selecting, based upon the graphical representation of the orientation data on the screen display, a respective display frame to thereby identify the orientation in which the visual image will be graphically displayed on the screen display of the sonar system.

27. A method according to claim 26 further comprising the steps of:

providing data representative of a reference icon; and displaying the reference icon concurrent with said step of displaying the orientation data to thereby provide the operator with a frame of reference with respect to the predetermined orientations of the plurality of display frames.

28. A method according to claim 26 wherein the sonar system includes at least one transducer for emitting and receiving sonar signals through a body of water, the method further comprising the steps of:

providing characterization data representative of the predetermined signal characteristics of said at least one transducer; and displaying the characterization data concurrent with said step of displaying the orientation data to thereby provide the operator with a graphical representation of the coverage provided by the at least one transducer as defined by the characterization data.

29. A method according to claim 26 wherein said displaying step further comprises the step of sequentially displaying the orientation data representative of each of the plurality of display frames on the screen display.

* * * * *